(12) United States Patent
Evans et al.

(10) Patent No.: US 12,405,003 B2
(45) Date of Patent: Sep. 2, 2025

(54) THERMAL OXIDIZATION SYSTEMS AND METHODS WITH GREENHOUSE GAS CAPTURE

(71) Applicant: Emission Rx, LLC, Avon, IN (US)

(72) Inventors: Brian Douglas Evans, Rome (IT); Thomas Darrell Evans, Avon, IN (US); Lisa Carolyn Kern, Plainfield, IN (US); Andrea Christine Moberly, Avon, IN (US)

(73) Assignee: Emission Rx, LLC, Avon, IN (US)

( * ) Notice: Subject to any disclaimer, the term of this patent is extended or adjusted under 35 U.S.C. 154(b) by 601 days.

(21) Appl. No.: 17/838,094

(22) Filed: Jun. 10, 2022

(65) Prior Publication Data

US 2022/0307688 A1    Sep. 29, 2022

Related U.S. Application Data

(63) Continuation-in-part of application No. 16/313,368, filed as application No. PCT/US2017/039575 on Jun. 27, 2017, now Pat. No. 11,391,458.

(Continued)

(51) Int. Cl.
*F23G 7/06* (2006.01)
*B01D 53/44* (2006.01)
(Continued)

(52) U.S. Cl.
CPC ............ *F23G 7/061* (2013.01); *B01D 53/44* (2013.01); *F23J 15/04* (2013.01); *F23N 1/022* (2013.01);
(Continued)

(58) Field of Classification Search
CPC .............. F23G 7/063; F23G 2202/101; F23G 2207/101; F23D 14/62; F23N 5/102; B01D 2257/708
See application file for complete search history.

(56) References Cited

U.S. PATENT DOCUMENTS 2,121,733 A    6/1938   Cottrell
3,658,482 A    4/1972   Evans et al.
(Continued)

OTHER PUBLICATIONS

International Search Report and Written Opinion dated Sep. 6, 2017, for International Application No. PCT/US2017/039575, 17 pages.

*Primary Examiner* — Vivek K Shirsat
(74) *Attorney, Agent, or Firm* — Frost Brown Todd LLP

(57) ABSTRACT

A thermal oxidizer employing an oxidation mixer, an oxidation chamber, a retention chamber and a heat dissipater forming a fluid flow path for thermal oxidation of a waste gas. In operation, the oxidation mixer facilitates a combustible mixture of the waste gas and an oxidant into an combustible waste gas stream, the oxidation chamber facilitates a primary combustion reaction of the combustible waste gas stream into an oxygenated waste gas stream, the retention chamber facilitates a secondary combustion reaction of the oxygenated waste gas stream into oxidized gases and the heat dissipator reduces the temperature of the flow of oxidized gases within the heat dissipator, which is communicated to a greenhouse gas processor that extracts greenhouse gas(es) from the vaporized oxidized gases. The greenhouse gas processor may condensate the greenhouse gas(es), acid neutralize the condensation of the greenhouse gas(es), and capture the acid neutralization of the condensation of the greenhouse gas(es).

20 Claims, 26 Drawing Sheets

Related U.S. Application Data

(60) Provisional application No. 62/354,991, filed on Jun. 27, 2016.

(51) Int. Cl.
 *F23J 15/04* (2006.01)
 *F23N 1/02* (2006.01)

(52) U.S. Cl.
 CPC .... *B01D 2258/02* (2013.01); *F23G 2207/101* (2013.01); *F23G 2207/20* (2013.01); *F23G 2207/30* (2013.01)

(56) References Cited

U.S. PATENT DOCUMENTS

| | | |
|---|---|---|
| 3,870,474 A | 3/1975 | Houston |
| 3,895,918 A | 7/1975 | Mueller |
| 3,914,088 A | 10/1975 | Huyck |
| 4,025,324 A | 5/1977 | Stackhouse, Jr. et al. |
| 4,135,885 A | 1/1979 | Wormser et al. |
| 4,332,206 A | 6/1982 | Tucker et al. |
| 4,358,268 A | 11/1982 | Neville |
| 4,454,826 A | 6/1984 | Benedick |
| 4,688,495 A | 8/1987 | Galloway |
| 4,793,974 A | 12/1988 | Hebrank |
| 4,819,571 A | 4/1989 | Hallett |
| 4,878,839 A | 11/1989 | Wunning |
| 4,976,611 A | 12/1990 | Knop et al. |
| 4,983,362 A | 1/1991 | Obermuller |
| 5,026,277 A | 6/1991 | York |
| 5,098,286 A | 3/1992 | York |
| 5,129,332 A | 7/1992 | Greco |
| 5,163,829 A | 11/1992 | Wildenberg |
| 5,184,951 A | 2/1993 | Nutcher et al. |
| 5,259,757 A | 11/1993 | Plejdrup et al. |
| 5,262,131 A | 11/1993 | Bayer et al. |
| 5,286,459 A | 2/1994 | Krismanth |
| 5,352,115 A | 10/1994 | Klobucar |
| 5,453,259 A | 9/1995 | D'Souza |
| 5,531,593 A | 7/1996 | Klobucar |
| 5,533,890 A | 7/1996 | Holst et al. |
| 5,578,276 A | 11/1996 | Klobucar |
| 5,612,005 A | 3/1997 | Garvey |
| 5,620,668 A | 4/1997 | Driscoll et al. |
| 5,657,706 A | 8/1997 | Liagre et al. |
| 5,770,784 A | 6/1998 | Heywood et al. |
| 5,800,792 A | 9/1998 | Lbaraki et al. |
| 5,871,349 A | 2/1999 | Johnson et al. |
| 5,888,063 A | 3/1999 | Scott et al. |
| 5,941,184 A | 8/1999 | Casacia et al. |
| 5,989,010 A | 11/1999 | Martin et al. |
| 6,015,540 A | 1/2000 | McAdams et al. |
| 6,019,597 A | 2/2000 | Martin et al. |
| 6,228,329 B1 | 5/2001 | Garvey |
| 6,257,869 B1 | 7/2001 | Martin et al. |
| 6,321,462 B1 | 11/2001 | Seidl et al. |
| 6,622,780 B1 | 9/2003 | Pötzl |
| 6,857,379 B2 | 2/2005 | Gross et al. |
| 7,017,592 B2 | 3/2006 | Chiles et al. |
| 7,033,544 B2 | 4/2006 | Tesar et al. |
| 7,494,625 B2 | 2/2009 | Abrams |
| 7,507,084 B2 | 3/2009 | Chiles et al. |
| 8,124,017 B2 | 2/2012 | Harold et al. |
| 8,237,006 B2 | 8/2012 | Stone et al. |
| 8,318,115 B2 | 11/2012 | Harold et al. |
| 8,459,193 B2 | 6/2013 | Mulcahy |
| 8,740,613 B1 | 6/2014 | Friend |
| 9,651,249 B2 | 5/2017 | Gosiewski et al. |
| 10,174,942 B2 | 1/2019 | Kashiwagi et al. |
| 11,391,458 B2 | 7/2022 | Evans et al. |
| 2003/0035762 A1 | 2/2003 | Cash |
| 2004/0103832 A1 | 6/2004 | Gross et al. |
| 2005/0153252 A1 | 7/2005 | Crawley et al. |
| 2005/0260103 A1 | 11/2005 | Tesar et al. |
| 2006/0144700 A1 | 7/2006 | Carson et al. |
| 2007/0033873 A1 | 2/2007 | D'Souza |
| 2007/0042306 A1 | 2/2007 | Bacon |
| 2008/0244975 A1 | 10/2008 | Johnston |
| 2011/0209698 A1 | 9/2011 | Mulcahy |
| 2012/0122046 A1 | 5/2012 | Tsantrizos et al. |
| 2012/0128541 A1 | 5/2012 | Kashiwagi et al. |
| 2012/0192547 A1 | 8/2012 | Mastbergen et al. |

THERMAL OXIDIZATION SYSTEMS AND METHODS WITH GREENHOUSE GAS CAPTURE

CROSS-REFERENCE TO RELATED APPLICATIONS

The present application is a continuation-in-part of U.S. application Ser. No. 16/313,368 entitled "Thermal Oxidization Systems and Methods," filed Dec. 26, 2018, which is a national stage entry of PCT/US17/39575 entitled "Thermal Oxidization Systems and Methods," filed Jun. 27, 2017, which claims priority to U.S. Provisional Application No. 62/354,991 entitled "Thermal Oxidization Systems and Methods," filed Jun. 27, 2016, (collectively the "Priority Applications"). This present application claims priority and benefit of the Priority Applications. The content of the Priority Applications is incorporated herein by reference.

FIELD OF THE INVENTION

The present disclosure generally relates to a thermal oxidation of waste gas (e.g., toxic release inventory ("TRI") gases, particularly volatile organic compound ("VOC")) into desirable oxidized gases including carbon dioxide gas ($CO_2$), water vapor ($H_2O$), nitrogen gas ($N_2$) and oxygen gas ($O_2$).

The present disclosure specifically relates to a controlled thermal oxidation of the waste gas involving a regulated combustible mixture of the waste gas and an oxidant (e.g., atmospheric air), a regulated combustion reaction of the combustible mixture into desirable oxidized gases and/or a regulated atmospheric venting of desirable oxidized gases.

BACKGROUND OF THE INVENTION

FIG. 1 illustrates a thermal oxidizer 20 known in the art of the present disclosure. Thermal oxidizer 20 employs a heating chamber 21 and a perforated oxidation reaction ("POR") chamber 24 forming a fluid flow path for a desired oxidation of a waste gas stream 32 (e.g., TRI gases) into oxidized gases 41 (e.g., $CO_2$, $H_2O$, $N_2$ and $O_2$).

In operation, a heating element 22 within heating chamber 21 is activated to generate heat waves 23 for heating waste gas stream 32 as waste gas stream 32 is feed from a waste gas source 30 via an inlet conduit 31 through heating chamber 21 into POR chamber 24 and as an oxidant 10 (e.g., atmospheric air) flows into POR chamber 24. The heating of waste gas stream 32 is intended to facilitate a combustible oxidation 40 of waste gas stream 32 within POR chamber 24 into oxidized gases 41. However, there are design flaws with thermal oxidizer 20 that impedes a combustible oxidation 40 of waste gas stream 32 within POR chamber 24 into oxidized gases 41.

First, thermal oxidizer 20 fails to regulate a combustible mixture of waste gas stream 32 and oxidant 10 within a flammable range between an upper explosive limit ("UEL") and a lower explosive level ("LEL") as known in the art of the present disclosure, particularly when waste gas stream 32 enters heating chamber 21 at a concentration below the LEL for waste gas stream 32 (i.e., waste gas is to lean). Specifically, a simultaneous suction of oxidant 10 into POR chamber 24 and venting of any gases within POR chamber 24 impedes a sufficient flow of oxidant 10 into POR chamber 24 to ensure a combustible mixture of waste gas stream 32 and oxidant 10 within the flammable range. Consequently, while the combustible mixture of waste gas stream 32 and oxidant 10 may be within the flammable range upon a power-on of thermal oxidizer 20, the mixture of waste gas stream 32 and oxidant 10 will eventually become too "rich" for combustible oxidation 40 within POR chamber 24. As a result, an incomplete combustion facilitates a buildup of high concentrations of undesirable gases (e.g., carbon monoxide (CO)) and soot within POR chamber 24.

Second, thermal oxidizer 20 fails to regulate a combustion reaction of waste gas stream 32 within POR chamber 24. Specifically, thermal oxidizer 20 does not regulate the heating of heating element 22. Consequently, additional undesirable gases (e.g., nitrogen oxides (NO) and ($NO_2$)) (not shown) may form within POR chamber 24 if a temperature of heating waves 23 is too high. Moreover, even if the heating of heating element 22 was regulated, POR chamber 24 is configured and sized for an instantaneous combustible oxidation 40 of waste gas stream 32 without a sufficient retention time for a combustible mixture of waste gas stream 32 and oxidant 10, if any, to convert to desirable oxidized gases 41 (e.g., $CO_2$, $H_2O$, $N_2$ and $O_2$).

The inventions of the present disclosure overcome the drawbacks of prior heating element based thermal oxidizers, particularly thermal oxidizer 20 of FIG. 1.

SUMMARY OF THE INVENTION

One form of the inventions of the present disclosure is a thermal oxidizer employing an oxidation mixer, an oxidation chamber, a retention chamber and a heat dissipater forming a fluid flow path for thermal oxidation of a waste gas (e.g., toxic release inventory ("TRI") gases, particularly volatile organic compound ("VOC")).

In operation, the oxidation mixer facilitates a combustible mixture of the waste gas and an oxidant (e.g., atmospheric air) into a combustible waste gas stream.

For purposes of the inventions of the present disclosure, the term "combustible waste gas stream" broadly encompasses any stream of gas including molecules combinable with oxygen or combust resulting in heat and light, and excludes totally inert gases.

The oxidation mixer may be any form of any oxidation mixer as known in the art of the present disclosure and hereinafter conceived including, but not limited to, a venturi or distributed air-gas mixer.

The oxidation mixer may be fed the waste gas via any type of waste gas feeding mechanism known in the art of the present disclosure and hereinafter conceived including, but not limited to, (1) an aeration nozzle, (2) an aeration nozzle and back flow preventer and (3) an aeration nozzle, back flow preventer and blocking valve.

The oxidation mixer may be fed the oxidant via any type of oxidant feeding mechanism as known in the art of the present disclosure and hereinafter conceived including, but not limited to, (1) an open air inlet involving an inductive air/waste gas flow optionally providing flash back protection, (2) a force modulation air blower with a mixing "T" or (3) a forced modulation air pump and mixing "T".

A heating element or a gas burner of the oxidation chamber generate heat waves facilitating a primary combustion reaction of the combustible waste gas stream flowing from the oxidation mixer to the oxidation chamber.

For purposes of the inventions of the present disclosure,
(1) the term "heating element" broadly encompasses any element for converting electricity into heat through the process of Joule/ohmic/resistive, inductive or other means of electrical heating, (2) the term "gas burner" broadly encompasses an element for igniting a natural gas stream, (3) the term "primary combustion reaction" broadly encompasses an oxidation of the combustible waste gas stream flowing from the oxidation mixer into the oxidation chamber involving a partial combustion of the combustible waste gas stream within the oxidation chamber resulting in an oxygenated waste gas stream, and (4) the term "oxygenated waste gas stream" broadly encompasses a partial combustion of the combustible waste gas stream in many forms including, but not limited to, CO+other hydrocarbon compounds+$CO_2$+$H_2O$+$N_2$+excess $O_2$.

The oxygenated waste gas stream flows from the oxidation chamber into the retention chamber whereby the retention chamber facilitates a secondary combustion reaction as needed of the oxygenated waste gas stream into oxidized gases. For purposes of the inventions of the present disclosure, the term "secondary combustion reaction" encompasses a complete oxidation of the oxygenated waste gas stream flowing from the oxidation chamber to the retention chamber involving a conversion of the oxygenated waste gas stream into oxidized gases (e.g., $CO_2$, $H_2O$, $N_2$ and $O_2$). The retention chamber may also include an additional heating element to facilitate the complete oxidation of oxygenated waste gas stream into oxidized gases.

Concurrently or alternatively, the oxidation chamber may further include an supplemental oxidant inlet for mixing additional oxidant to the oxygenated waste gas stream into a combustible oxygenated waste gas stream flowing into the retention chamber.

The heat dissipater facilitates an atmospheric venting of the oxidized gases flowing into the heat dissipater from the retention chamber.

Another form of inventions of the present disclosure is a thermal oxidization system including a thermal oxidizer of the present disclosure and a greenhouse gas processor. For purposes of the inventions of the present disclosure, the term "greenhouse gas processor" broadly encompasses any machine structurally configured to extract greenhouse gas(es) within oxidized gases.

For this thermal oxidization system, a heat dissipator of the thermal oxidizer heat dissipates the flow of oxidized gases within the heat dissipator and communicates the oxidized gases at a reduced temperature to the greenhouse gas processor.

In operation, the greenhouse gas processor extracts greenhouse gas(es) from within the oxidized gases, and may further vent non-greenhouse gas(es) within the oxidized gases.

In extracting the greenhouse gas(es) from within the oxidized gases, the greenhouse gas processor may liquid condensate the greenhouse gas(es), acid neutralize the condensation of the greenhouse gas(es) and capture the acid neutralized condensation of the greenhouse gas(es).

The foregoing forms and other forms of the present invention as well as various features and advantages of the present invention will become further apparent from the following detailed description of various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PREFERRED EMBODIMENTS

Figure 1:
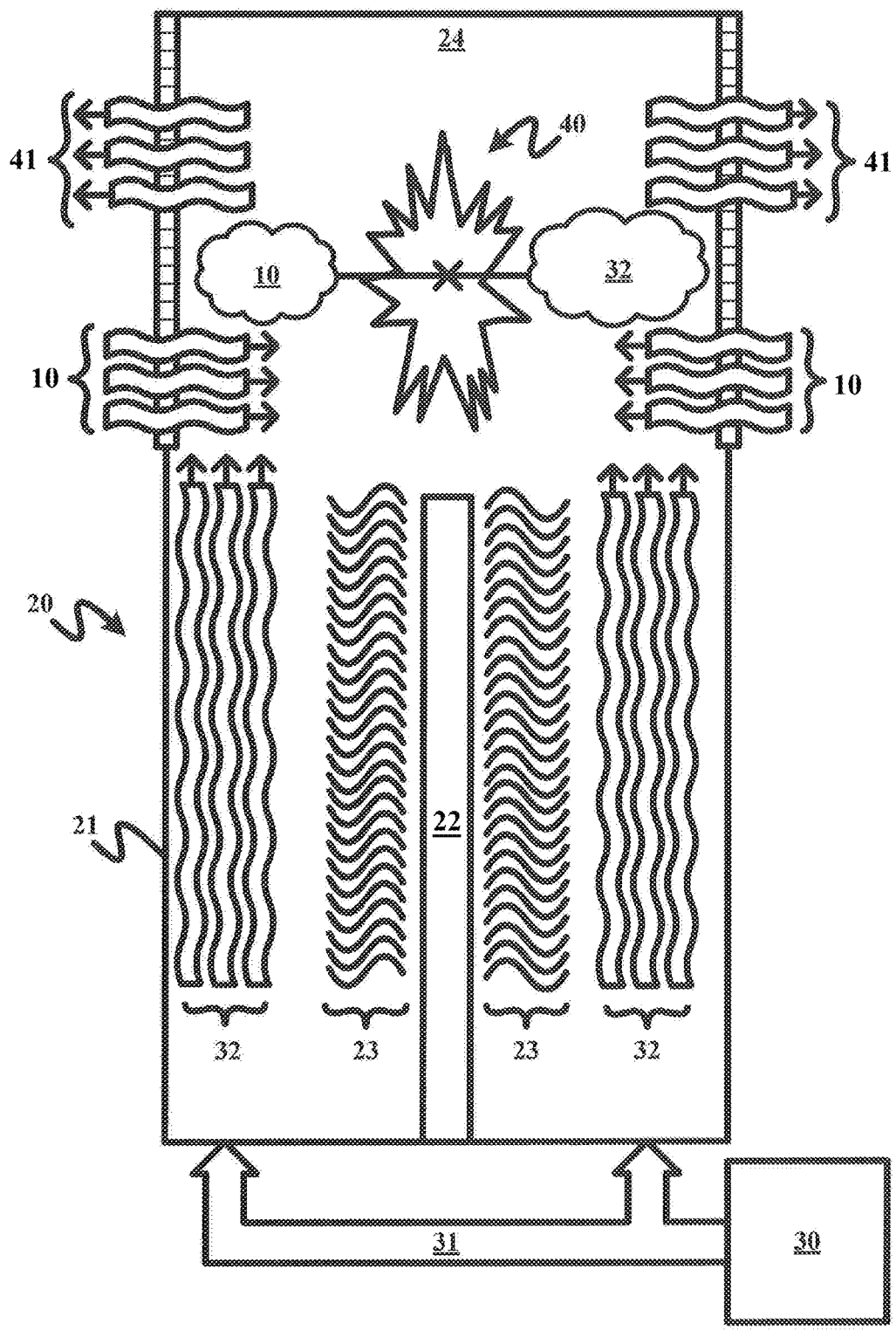
FIG. 1 illustrates a block diagram of an exemplary thermal oxidizer as known in the art.
Figure 2:
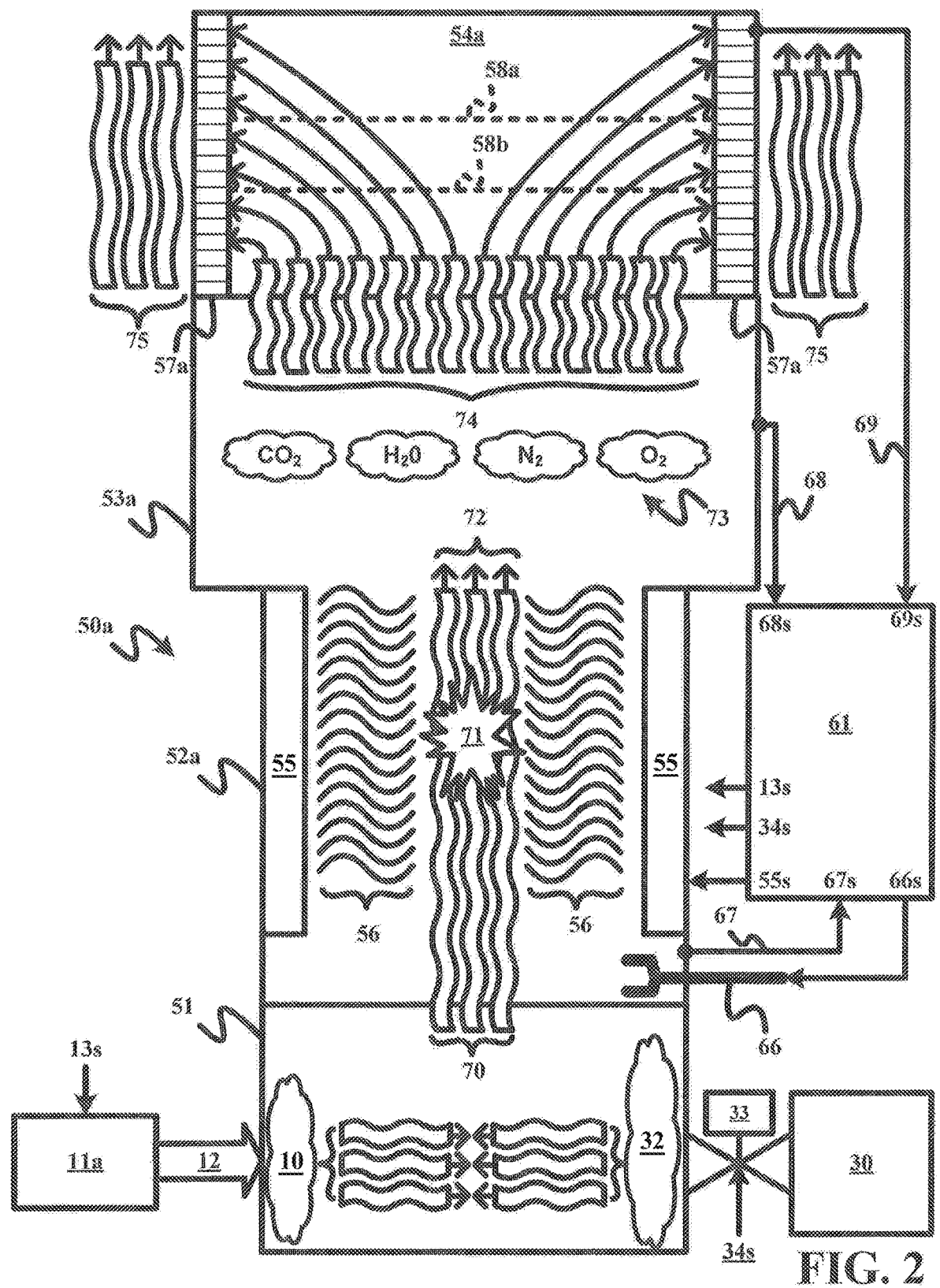
FIG. 2 illustrates a block diagram of a first exemplary chamber embodiment of a thermal oxidization system in accordance with the inventive principles of the present disclosure.
Figure 3:
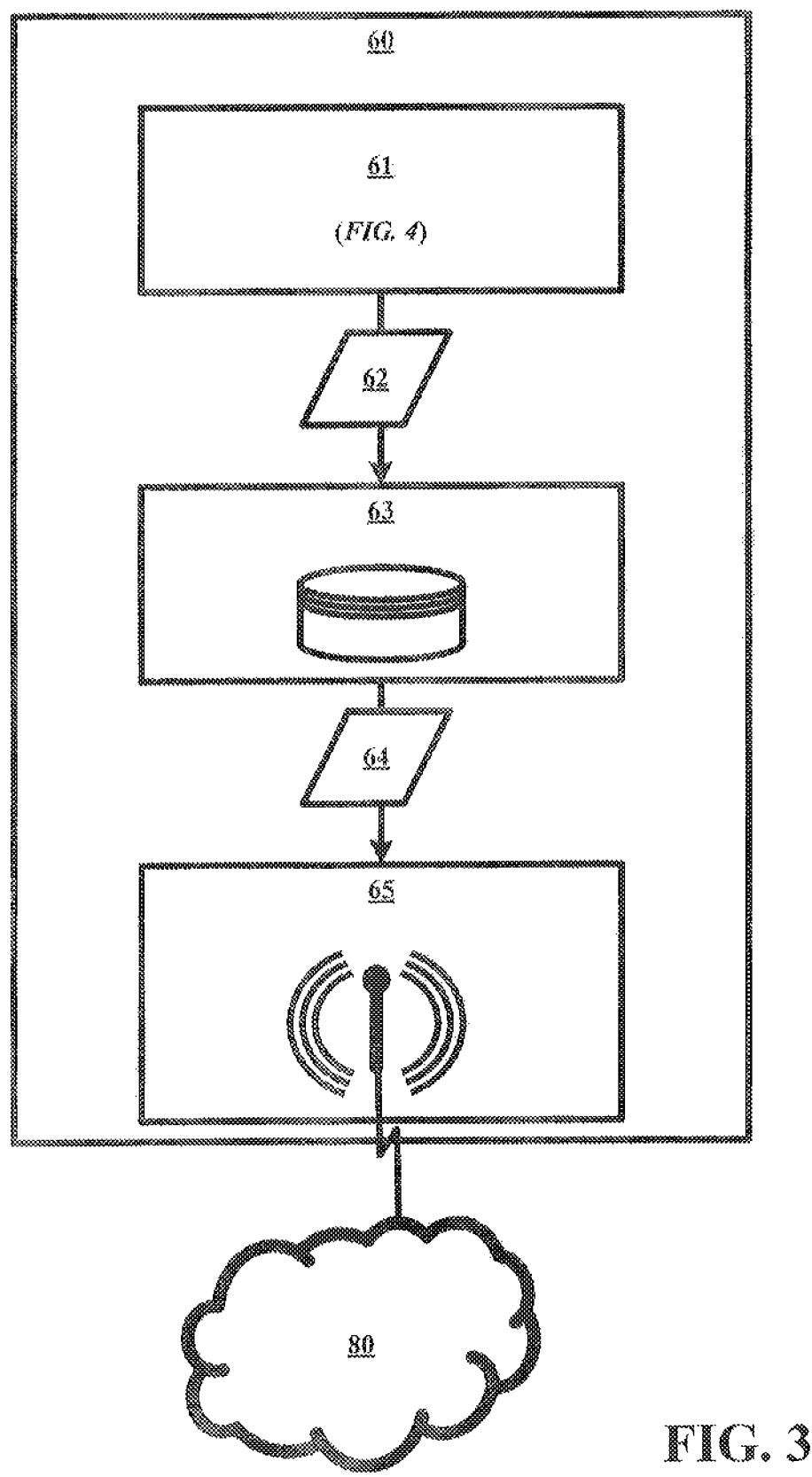
FIG. 3 illustrates a block diagram of an exemplary embodiment of a control system in accordance with the inventive principles of the present disclosure.

To facilitate an understanding of inventions of the present disclosure, the following description of FIGS. 2-4 teach basic inventive principles of thermal oxidization systems and thermal oxidization methods of the present disclosure. From this description, those having ordinary skill in the art will appreciate how to apply the inventive principles of the present disclosure for making and using additional numerous and various embodiments of thermal oxidization systems and thermal oxidization methods of the present disclosure.

Referring to FIG. 2, a thermal oxidization system of the present disclosure incorporates a thermal oxidizer 50a employing an oxidation mixer 51, an oxidation chamber 52a, a retention chamber 53a and a heat dissipater 54a forming a fluid flow path for oxidation of a waste gas stream 32 (e.g., TRI gases) into oxidized combustion products 74 (e.g., oxidized gases 73 including $CO_2$, $H_2O$, $N_2$ and $O_2$).

Oxidation mixer 51 is structurally configured for implementing a combustible mixture of an oxidant 10 (e.g., atmospheric air) supplied by oxidant supply 11 (e.g., a blower or a pump) via a supply line 12 and of a waste gas stream 32 (e.g., TRI gases) supplied by a waste gas source 30 as controlled via a control flow conduit 33 (e.g., a solenoid valve and a flame arrestor in series coupling waste gas source 30 to oxidation mixer 51) into a combustible waste gas stream 70.

In one embodiment, oxidation mixer 51 is a venturi air-gas mixer whereby turbulent fluid flows of oxidant 10 and waste gas stream 32 into the venture air-gas mixer are controlled via oxidant supply 11 and control flow conduit 33 to ensure combustible waste gas stream 70 attains proportional concentrations of oxidant 10 and waste gas stream 32 within a flammable range (e.g., 11.5:1 oxidant 10 to waste gas stream 32). Additionally, oxidation mixer 51 may be equipped with a nozzle (not shown) for regulating a feeding of combustible waste gas stream 70 into oxidation chamber 52a whereby the nozzle may be structurally configured to generate more turbulence to combustible waste gas stream 70.

Oxidation chamber 52a is structurally configured for implementing a primary combustion reaction 71 therein of combustible waste gas stream 70 into an oxygenated waste gas stream 72 via a controlled emission of heat waves 56 by a heating element 55. In one embodiment, oxidation chamber 52a is a refractory ceramic cylinder and heating element 55 is embedded within the walls of the refractory ceramic cylinder.

Optionally, oxidation chamber 52a may further employ a spark igniter 66 for a controlled ignition of combustible waste gas stream 70 at a proximal opening of oxidation chamber 52a. For this embodiment, if oxidization mixer 51 is equipped with a nozzle, then a distal tip of spark igniter 66 may be positioned within or adjacent to the flow of the combustible waste gas stream 70 out of the nozzle into oxidation chamber 52a.

Retention chamber 53a is structurally configured for implementing a retention time for a secondary combustion reaction of oxygenated waste gas stream 72 into heated oxidized combustion products 74 (e.g., oxidized gases 73 including $CO_2$, $H_2O$, $N_2$ and $O_2$). In one embodiment, retention chamber 53a is a refractory ceramic cylinder integrated with oxidation chamber 52a as shown.

Heat dissipater 54a is structurally configured for implementing a heat exchange of atmosphere air 75 with heated oxidized combustion products 74 to vent cooled oxidized combustion products 74 into the atmosphere. In one embodiment, heat dissipater 54a includes a heat exchanger 57a constructed of stainless steel woven fabric, which has been pleated and rolled into a cylinder shape whereby oxidized combustion products 74 exits heat exchanger 57a along a length and circumference of the vertical wall of heat exchanger 57a as shown with cooling atmosphere air 75 being directed vertically past the vertical wall of heat exchanger 57a to thereby extract heat from heat dissipater 54a.

Additionally, heat dissipater 54a may be equipped with mesh baffles (e.g., mesh baffles 58b and 58c as shown) axially aligned on a longitudinal axis of the cylindrical heat exchanger 57a to thereby provide a more controlled flow diversion of oxidized combustion products 74 in a direction of vertical wall of heat exchanger 57a as shown in FIG. 2.

Referring to FIG. 3, thermal oxidization system of the present disclosure further incorporates a control system employing an oxidation controller 61, a data logger 63 and a data reporter 65 housed within a control box 60.

Figure 4A:
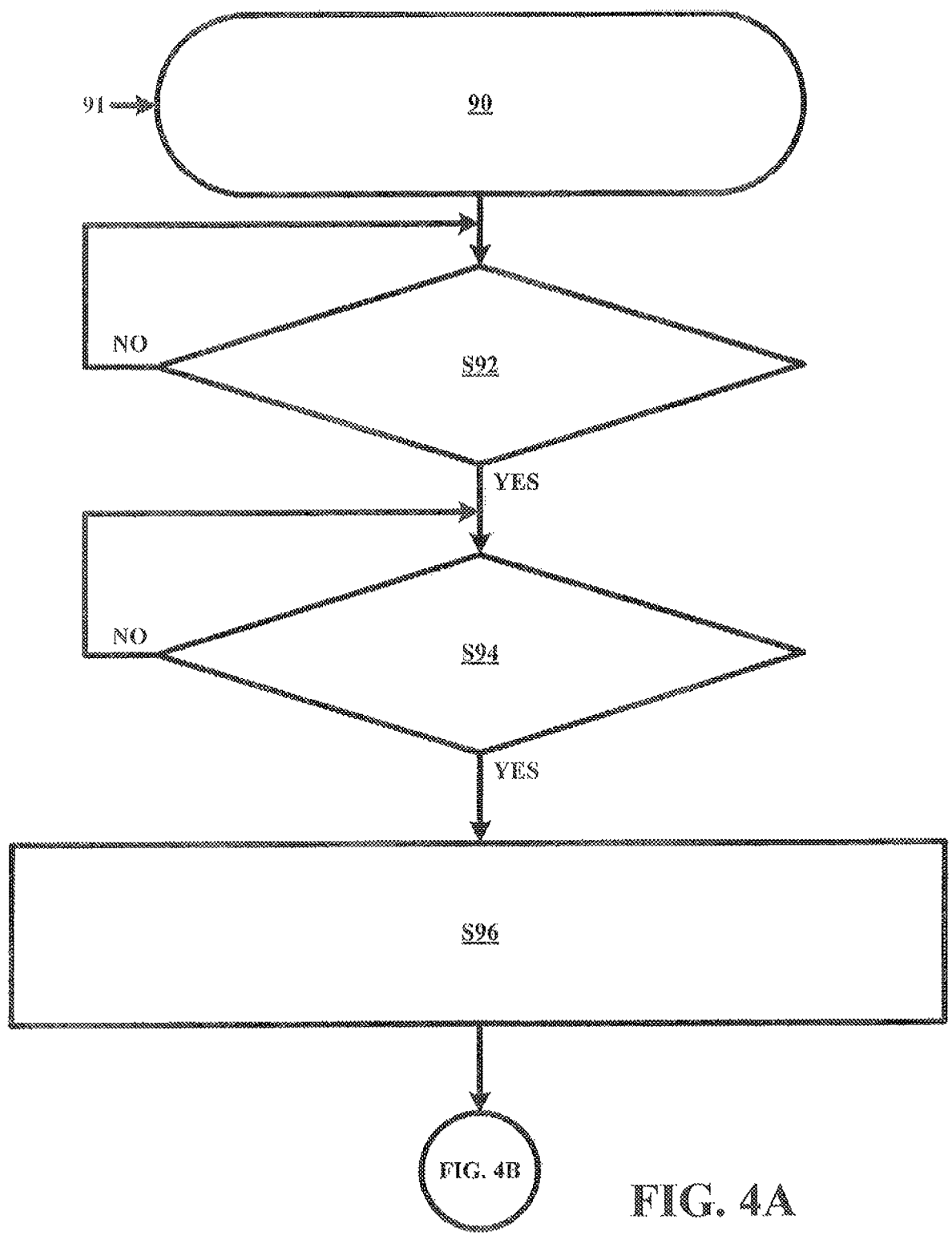
FIGS. 4A-4C illustrate a flowchart representative of an exemplary embodiment of a thermal oxidization method in accordance with the inventive principles of the present disclosure.
Figure 4B:
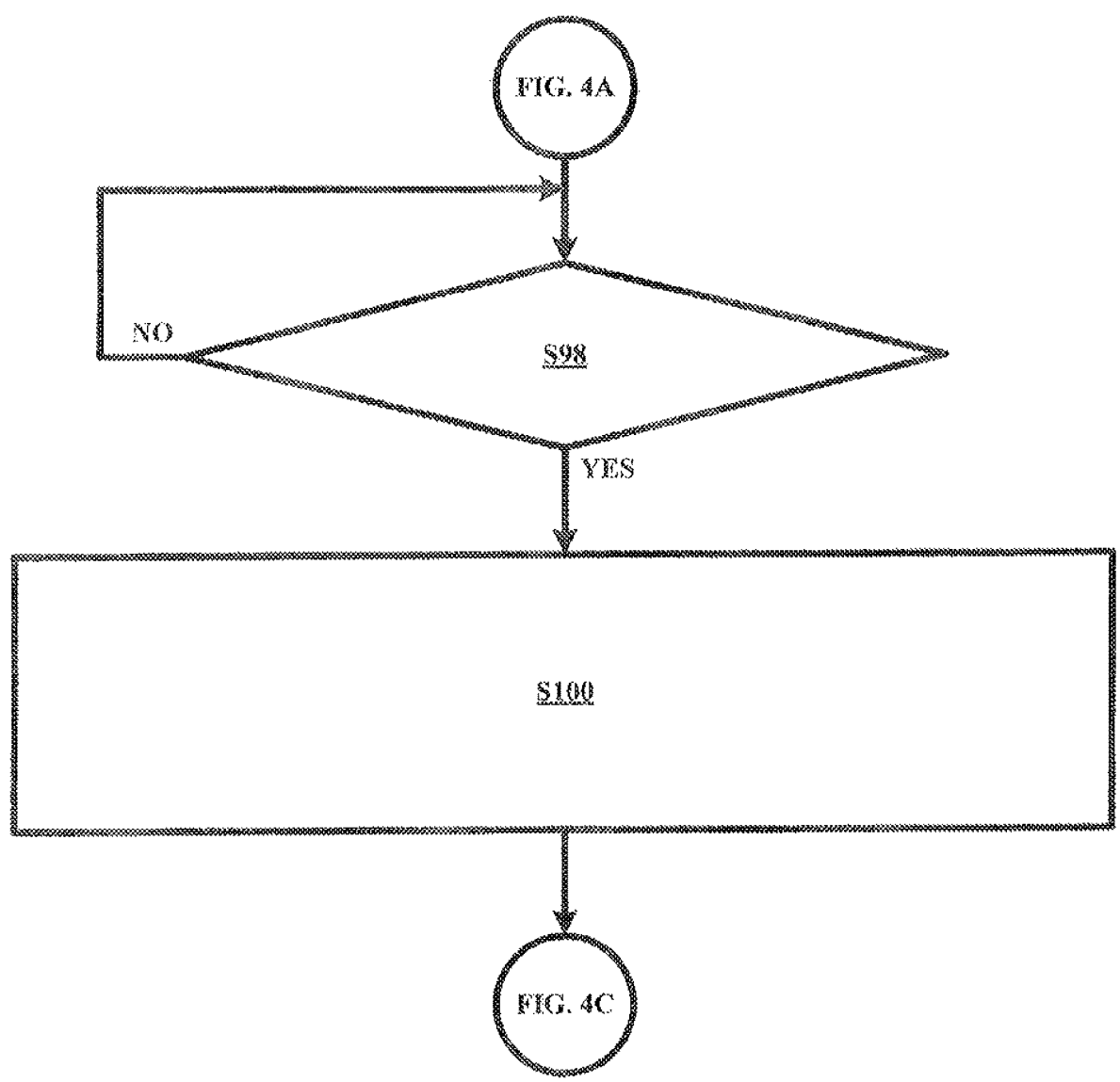
Figure 4C:
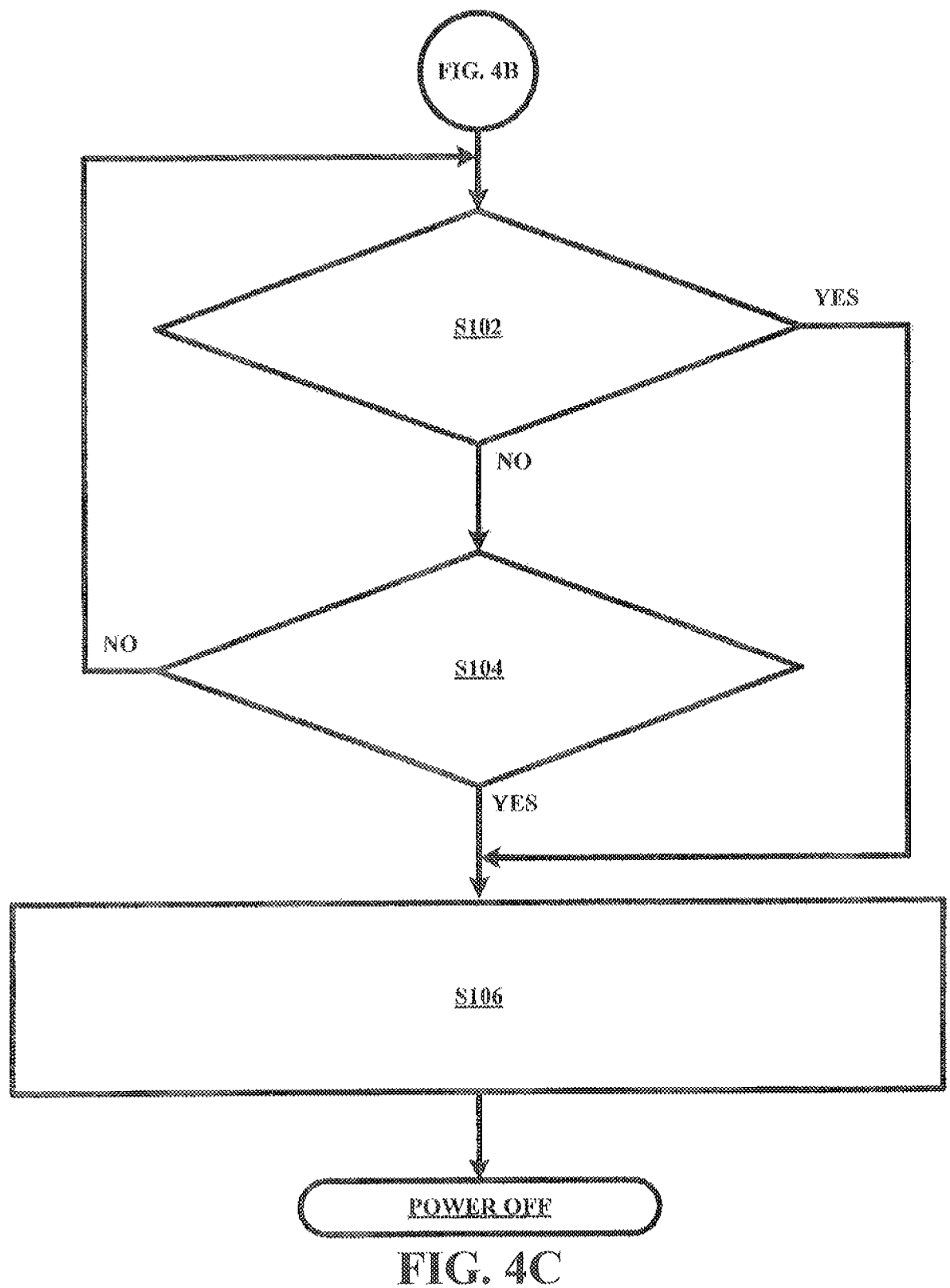

Oxidation controller 61 is structurally configured for controlling an operation of thermal oxidizer 50a as will be further described herein in connection with a description of FIGS. 4A-4C.

In one embodiment, oxidation controller 61 is an application specific main board or an application specific integrated circuit for controlling a thermal oxidation application of various inventive principles of the present disclosure as subsequently described herein in connection with FIGS. 4A-4C. The structural configuration of oxidation controller 61 may include, but is not limited to, processor(s), computer-usable/computer readable storage medium(s), an operating system, application module(s), peripheral device controller(s), slot(s) and port(s). Each application module consists of an electronic circuit and/or an executable program (e.g., executable software and/or firmware stored on non-transitory computer readable medium(s)) for controlling an execution of the thermal oxidation application.

A non-limiting example of oxidation controller 61 is an all-in-one XL4 controller sold by Horner APG of Indianapolis, Ind. that is configured in accordance with the inventive principles of the present disclosure.

Data logger 63 is structurally configured for logging operational data ("OD") 62 transmitted by oxidation controller 61 to data logger 63 via a push or pull operation, or by a monitoring of specific data points of oxidation controller 61 by data logger 63. Operational data 62 includes data informative of an operational status of thermal oxidizer 50a in executing the oxidation of waste gas stream 32.

In one embodiment, data logger 63 is an application specific main board or an application specific integrated circuit for controlling a data logging application of the present disclosure. The structural configuration of data logger 63 may include, but is not limited to, processor(s), computer-usable/computer readable storage medium(s), an operating system, application module(s), peripheral device controller(s), slot(s) and port(s). Each application module consists of an electronic circuit and/or an executable program (e.g., executable software and/or firmware stored on non-transitory computer readable medium(s)) for executing the data logging application.

A non-limiting example of data logger 63 is an all-in-one XLE controller sold by Horner APG of Indianapolis, Ind. that is configured in accordance with the inventive principles of the present disclosure.

Another non-limiting example of data logger 63 is as an application module configured within oxidation controller 61.

Also in practice, data logger 63 may be omitted and oxidation controller 61 may be configured for executing the data logging application of the present disclosure.

Data reporter 65 is structurally configured for receiving reporting data ("RD") 64 from data logger 63 via a push or pull operation and transmitting reporting data 64 to a network 80 (e.g., a cellular network). Reporting data 64 is operational data 62 processed by data logger 63 into a reporting format associated with data reporter 65.

In one embodiment, data reporter 65 is an application specific modem for executing a data reporting application of the present disclosure.

A non-limiting example of data logger 66 is a SonicU™ modem sold by SonicU, LLC of Greenfield, Ind. that is configured in accordance with the inventive principles of the present disclosure.

Referring back to FIG. 2, oxidation controller 61 regulates a control of thermal oxidizer 50a in accordance with a thermal oxidization method of the present disclosure as represented by a flowchart 90 shown in FIGS. 4A-4C. In support of executing the thermal oxidization method:

1. oxidation controller 61 senses and controls a flash point temperature $T_{FP}$ of oxidation chamber 52a via a connection of thermocouple 67 at a signal input 67s;
2. oxidation controller 61 senses and controls an oxidation point temperature $T_{Op}$ of retention chamber 53a via a connection of thermocouple 68 at a signal input 68s;
3. oxidation controller 61 senses and controls a venting point temperature $T_{FP}$ of heat dissipater 54a via a connection to thermocouple 69 at a signal input 69s;
4. oxidation controller 61 controls a feeding rate of oxidant 10 by oxidant supply 11 via a connection of a signal output 13s to oxidant supply 11a;
5. oxidation controller 61 controls a feeding rate of waste gas stream 32 by waste gas source 30 via a connection of a signal output 34s to control flow conduit 33;
6. oxidation controller 61 controls an activation and a deactivation of heating element 55 via a signal output 55s; and
7. oxidation controller 61 controls an activation and a deactivation of spark igniter 66 via a signal output 66s;

Referring to FIGS. 2 and 4A, prior to be oxidation controller 61 being powered-on, oxidant supply 11 is deactivated and control flow conduit 33 is closed.

Upon oxidation controller 61 being powered-on, oxidation controller 61 executes flowchart 90, and initiates a transmission of a point monitoring of flash point temperature $T_{FP}$, oxidization point temperature $T_{Op}$ and venting point temperature $T_{VP}$ to data logger 63 for recording purposes.

As to the execution of flowchart 90 by oxidation controller 61, a stage S92 of flowchart 90 encompasses a thermocouple validity check ("TVC") by oxidation controller 61 concurrently or sequentially involving:

1. a comparison by oxidation controller 61 of flash point temperature $T_{FP}$ relative to a flash thermocouple validity threshold ("FTVT");
2. a comparison by oxidation controller 61 of oxidation point temperature $T_{OP}$ relative to an oxidation thermocouple validity threshold ("OTVT"); and
3. a comparison by oxidation controller 61 of venting point temperature $T_{VP}$ relative to a venting thermocouple validity threshold ("VTVT").

In practice, to test the validity of the thermocouples, the thermocouple validity thresholds should be set at an anticipated maximum room temperature (e.g., 22° C.) or to an anticipated maximum local outdoor air temperature.

For a TVC cycle of stage S92, if flash point temperature $T_{FP}$ is more than flash thermocouple validity threshold FTVT, OR if oxidation point temperature $T_{OP}$ is more than oxidation thermocouple validity threshold OTVT, OR if venting point temperature $T_{VP}$ is more than venting thermocouple validity threshold VTVT, then oxidation controller 61 is powered down for a maintenance inspection of the thermocouple(s) and powered on again after a successful repair/replacement, if any, of the thermocouple(s).

Otherwise, if flash point temperature $T_{FP}$ is less than or equal to flash thermocouple validity threshold FTVT, AND if oxidation point temperature $T_{OP}$ is less than or equal to oxidation thermocouple validity threshold OTVT, AND if venting point temperature $T_{VP}$ is less than or equal to venting thermocouple validity threshold VTVT, then oxidation controller 61 proceeds to a stage S94 of flowchart 90 encompassing a thermal oxidation limit check ("TOLC") by oxidation controller 61 concurrently or sequentially involving:

1. a comparison by oxidation controller 61 of flash point temperature $T_{FP}$ relative to a flash thermal limit threshold ("FTLT");
2. a comparison by oxidation controller 61 of oxidation point temperature $T_{OP}$ relative to an oxidation thermal limit threshold ("OTLT"); and
3. a comparison by oxidation controller 61 of venting point temperature $T_{VP}$ relative to a venting thermal limit threshold ("VTLT").

In practice, to ensure a safe heat activation of oxidation chamber 52a, the thermal limit thresholds should represent a predefined maximum temperature of oxidation chamber 52a, retention chamber 53a and heat dissipater 54a prior to the heat activation of thermal oxidizer 50a (e.g., 300° F. for all thermocouple limit thresholds).

For a TOLC cycle of stage S94, if flash point temperature $T_{FP}$ is more than flash thermal limit threshold FTLT, OR if oxidation point temperature $T_{OP}$ is more than oxidation thermal limit threshold OTLT, OR if venting point temperature $T_{VP}$ is more than venting thermal limit threshold VTLT, then oxidation controller 61 returns to stage S94 to execute a new TOLC cycle.

Otherwise, if flash point temperature $T_{FP}$ is less than or equal to flash thermal limit threshold FTLT, AND if oxidation point temperature $T_{OP}$ is less than or equal to oxidation thermal limit threshold OTLT, AND if venting point temperature $T_{VP}$ is less than or equal to venting thermal limit threshold VTLT, then oxidation controller 61 proceeds to a stage S96 of flowchart 90 to execute a pre-oxidation stage of the thermal oxidation of waste gas stream 32 sequentially involving:

1. with control flow conduit 33 being closed via valve control signal VC (e.g., a binary open-close signal) and heating element 55 being deactivated via heat regulation signal HR (e.g., an AC current), oxidation controller 61 controlling a gaseous purge of thermal oxidizer 50a by activating oxidant supply 11 via a supply control signal SC (e.g., a digital amplitude signal) for a specified time period. For example, oxidation controller 61 may activate oxidant supply 11 via supply control signal for an oxidation feed of oxidant 10 (e.g., atmospheric air) into oxidation mixer 51 at a 100% oxidation feed rate of oxidized gas 10 for thirty (30) seconds to one (1) minute (e.g., the feed rate in cubic feet/minute over a duration exceeding at least four (4) times a volume of oxidation chamber 52a and retention chamber 53a);
2. after completion of the purge, oxidation controller 61 controlling an activation of oxidant supply 11 via supply control signal SC for an oxidation feed of oxidant 10 into oxidation mixer 51 at a 50% oxidation feed rate; and
3. concurrent with or subsequent to the 50% oxidation feed rate of oxidant 10 into oxidation mixer 51, oxidation controller 61 executing a zero crossover regulation of heating element 55 via heating regulation signal HR.

Upon executing stage S96, oxidation controller 61 proceeds to a stage S98 of flowchart 90 encompassing an oxidation chamber ignition check ("OCIC") by oxidation controller 61 involving a comparison by oxidation controller 61 of flash point temperature $T_{FP}$ relative to a oxidation chamber ignition threshold ("OCIT") (e.g., 1100° F.).

Oxidation controller 61 cycles through stage S98 until such time flash point temperature $T_{FP}$ is equal to or greater than oxidation chamber ignition threshold OCIT whereby oxidation controller 61 proceeds to a stage S100 of flowchart 90 to execute an oxidation stage of the thermal oxidation of waste gas stream 32 sequentially involving:

1. if spark ignitor 57 is employed, oxidation controller 61 controlling a spark ignition of combustible waste gas stream 70 within oxidation chamber 52*a* by activating spark igniter 57 via a spark ignition signal SI provided to a power supply of spark igniter 57 (not shown for clarity)(e.g., a spark plug transformer based power circuit). The spark ignition is executed to facilitate the primary combustion reaction 71 of combustible waste gas stream 70 within oxidation chamber 52*a*; and 2. oxidation controller 61 controlling an activation of a waste gas feed (e.g., 0.35 cubic feet/minute; 21 cubic feet/hour) into oxidation mixer 51 by opening control flow conduit 33 via valve control signal VC to form combustible waste gas stream 70 whereby oxidant 10 flowing into oxidation mixer 51 will create vacuum on waste gas stream 30 at the inlet of the oxidization mixer 51; and 3. oxidation controller 61 controlling a regulation of a secondary combustion reaction of oxygenated waste gas stream 72 within retention chamber 53*a* by modulating the oxidation feed rate of oxidant 10 by oxidant supply 11 based on a comparison of oxidation point temperature $T_{OP}$ relative to a oxidation feed modulation threshold ("OFMT") (e.g., 1400° F.). For example, the oxidation feed rate of oxidant 10 is increased if the oxidation point temperature $T_{OP}$ is less than the oxidation feed modulation threshold OFMT and conversely, the oxidation feed rate of oxidant 10 is decreased if the oxidation point temperature $T_{OP}$ is greater than the oxidation feed modulation threshold OFMT.

Upon executing stage S100, oxidation controller 61 proceeds to a stage S102 of flowchart 90 encompassing an oxidation protection check ("OPC") by oxidation controller 61 concurrently or sequentially involving:

1. a comparison by oxidation controller 61 of flash point temperature $T_{FP}$ relative to a flash point protection threshold ("FPPT");

2. a comparison by oxidation controller 61 of oxidation point temperature $T_{OP}$ relative to an oxidation point protection threshold ("OPPT"); and 3. a comparison by oxidation controller 61 of venting point temperature $T_{VP}$ relative to a venting point protection threshold ("VPPT").

In practice, to ensure oxidation protection of thermal oxidizer 50, the protection thresholds should represent a predefined maximum temperature of oxidation chamber 52*a*, retention chamber 53*a* and heat dissipater 54*a* during oxidation stage S100 (e.g., 1400° F. for oxidation chamber 52*a*, 1800° F. for retention chamber 53*a* and 300° F. for heat dissipater 54*a*).

For a OPC cycle of stage S102, if flash point temperature $T_{FP}$ is less than flash point protection threshold FPPT, AND if oxidation point temperature $T_{OP}$ is less than oxidation point protection threshold OPPT, AND if venting point temperature $T_{VP}$ is less than venting point protection threshold VPPT, then oxidation controller 61 proceeds to a stage S104 of flowchart 90 to be subsequently described herein.

Otherwise, if flash point temperature $T_{FP}$ is equal to or greater than flash point protection threshold FPPT, OR if oxidation point temperature $T_{OP}$ is equal to or greater than oxidation point protection threshold OPPT, OR if venting point temperature $T_{VP}$ is equal to or greater than venting point protection threshold VPPT, then oxidation controller 61 proceeds to a stage S106 of flowchart 90 to execute a shutdown stage of the thermal oxidation of waste gas stream 32 concurrently or sequentially involving:

1. oxidation controller 61 controlling a termination of waste gas feed into oxidation mixer 51 by closing control flow conduit 33 via valve control signal VC;

2. oxidation controller 61 controlling a deactivation of the zero crossover regulation of heating element 55 via heat regulation signal HR; and 3. oxidation controller 61 controlling an attenuation of the oxidation fee rate of oxidant 10 to zero (0) via supply control signal SC.

Upon completion of stage S106, oxidation controller 61 executes a power-off routine.

Still referring to FIG. 4C, stage S104 encompasses a waste gas limit check ("WGLC") by oxidization controller 61 involving:

1. a comparison by oxidation controller 61 of oxidation point temperature $T_{OP}$ relative to a waste gas limit threshold ("WGLT"); and 2. a comparison by oxidation controller 61 of an open duration $OD_{CV52}$ of control flow conduit 33 relative to a fixed time period X in any unit of time (e.g., seconds as shown).

In practice, the waste gas limit threshold represents a predefined temperature indicative of a failure to achieve a primary combustion reaction 71 within oxidation chamber 53*a* after time period X (e.g., ten (10) seconds) to thereby impede a flow of an unacceptable quantity of waste gas stream 32 through chambers 52*a* and 53*a*.

For a WGLP cycle of stage S104, if oxidation point temperature $T_{OP}$ is equal to or greater than waste gas limit threshold WGLT OR if open duration $OD_{CV52}$ of control flow conduit 33 is less than X seconds, then oxidation controller 61 returns to stage S102 as previously described herein.

Otherwise, if oxidation point temperature $T_{OP}$ is less than waste gas limit threshold AND if open duration $OD_{CV52}$ of control flow conduit 33 is equal to or greater than X seconds, then oxidation controller 61 proceeds to stage S106 as previously described herein.

Referring back to FIG. 3, previously stated herein, upon oxidation controller 61 being powered-on, data logger 62 initiates a recording of flash point temperature $T_{FP}$, oxidization point temperature $T_{OP}$ and venting point temperature $T_{VP}$ over a course of an execution of flowchart 90 by oxidation controller 61.

Furthermore, oxidation controller 61 may provide a local reporting of flash point temperature $T_{FP}$, oxidization point temperature $T_{OP}$ and venting point temperature $T_{VP}$ via a graphical display and/or data reporter 65 may provide a remote reporting of flash point temperature $T_{FP}$, oxidization point temperature $T_{OP}$ and venting point temperature $T_{VP}$ via a wireless communication to network 80.

In practice, oxidation controller 61 and/or data logger 63 may be further structurally configured to detect conditions suitable for a warning (e.g., a visual and/or audial alarm, and/or a text message) to be locally issued by oxidation controller 61 or remotely issued by data reporter 65. Such conditions include, but are not limited to, (1) a continual cycling of stage S94 indicative of an operational issue with thermal oxidizer 50, (2) an inability of oxidation chamber 52a to reach oxidation combustion ignition threshold OCIT during stage S98, and (3) an occurrence offstage S104 as an indication of an operational issue of thermal oxidizer 50.

In practice, the structural dimensions and material compositions of oxidation chamber 52, retention chamber 53a and heat dissipater 54a will be dependent upon the specific oxidation application (e.g., 20,000 BTU/hour of waste gas oxidization).

Figure 6A:
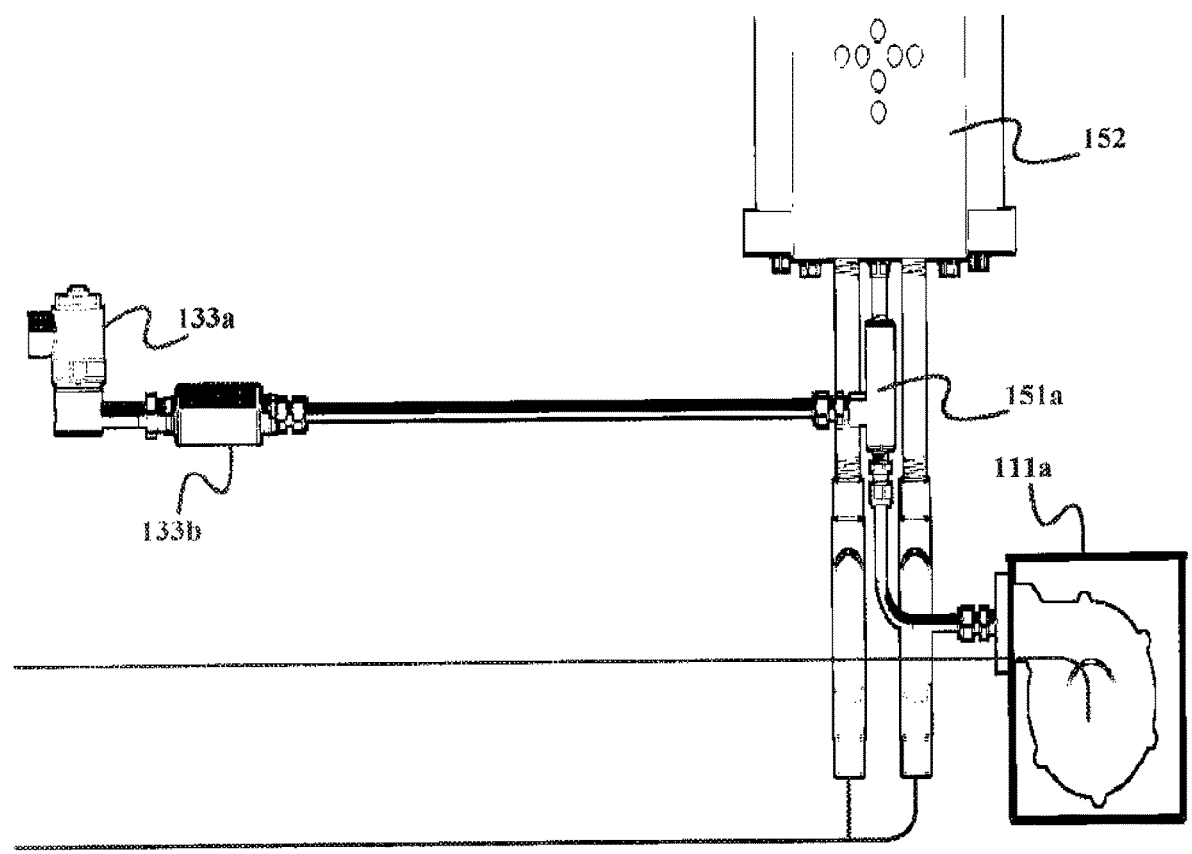
FIGS. 6A-6C illustrate exploded views of the thermal oxidization system of FIGS. 5A and 5B.
Figure 6B:
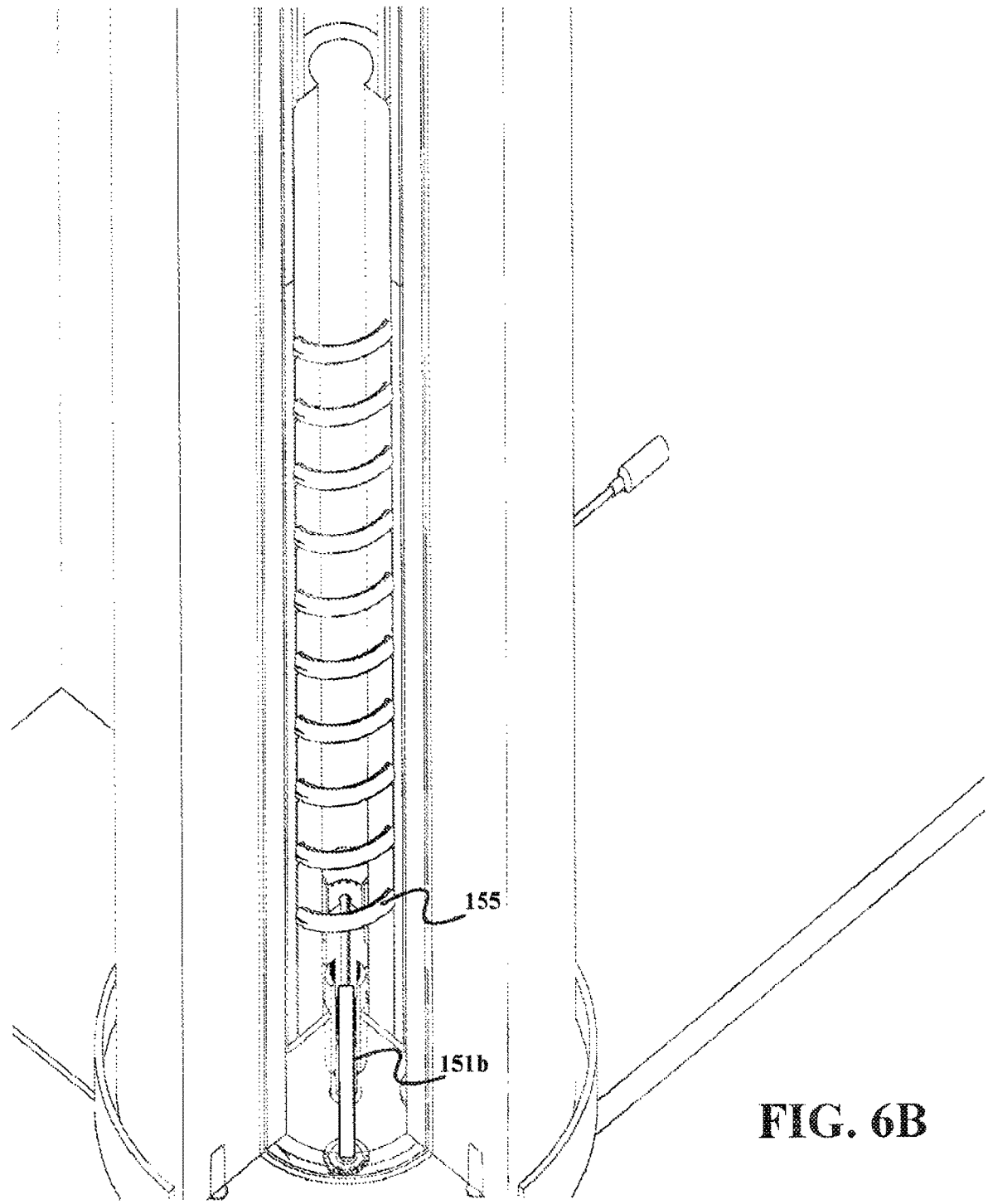
Figure 6C:
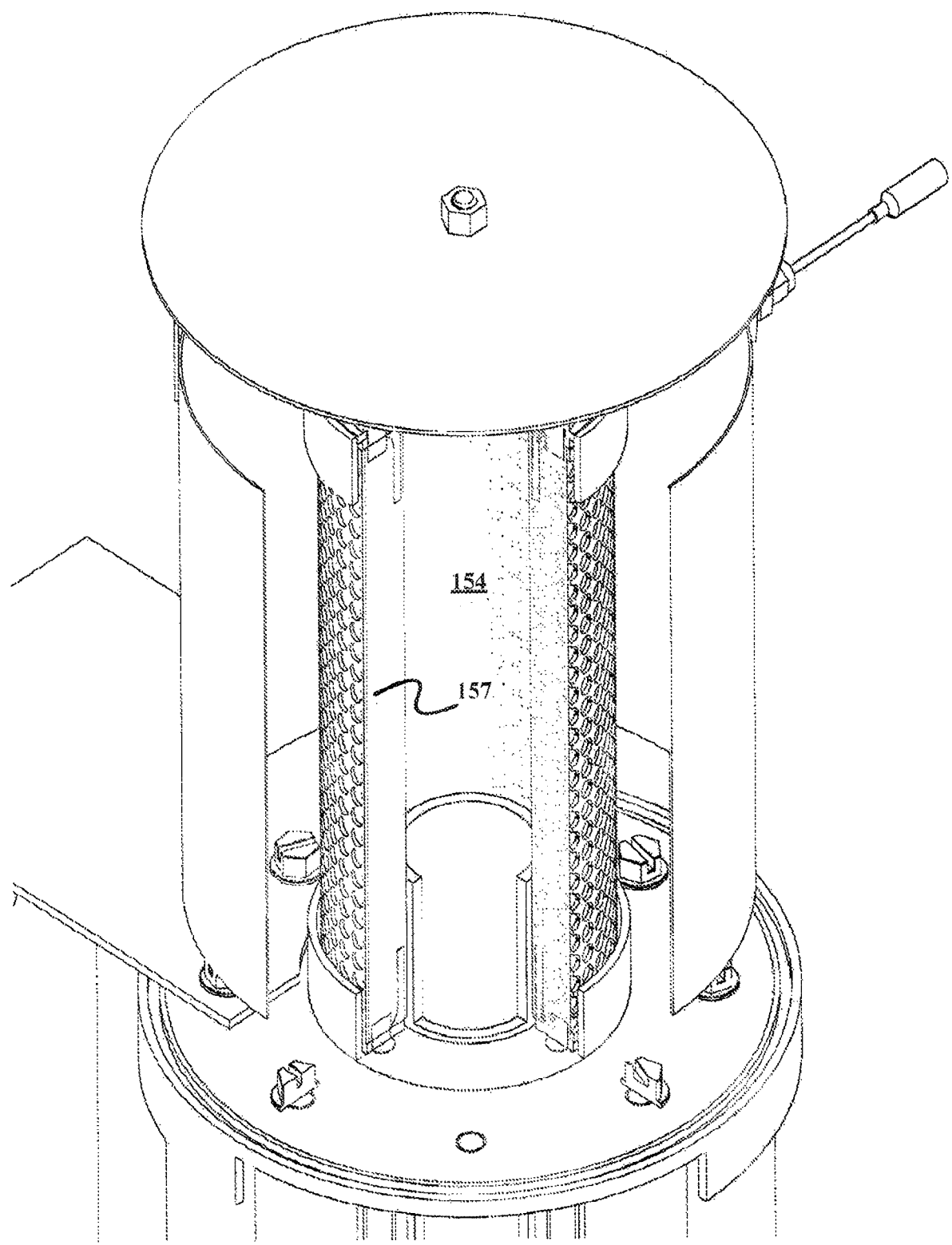
Figure 7:
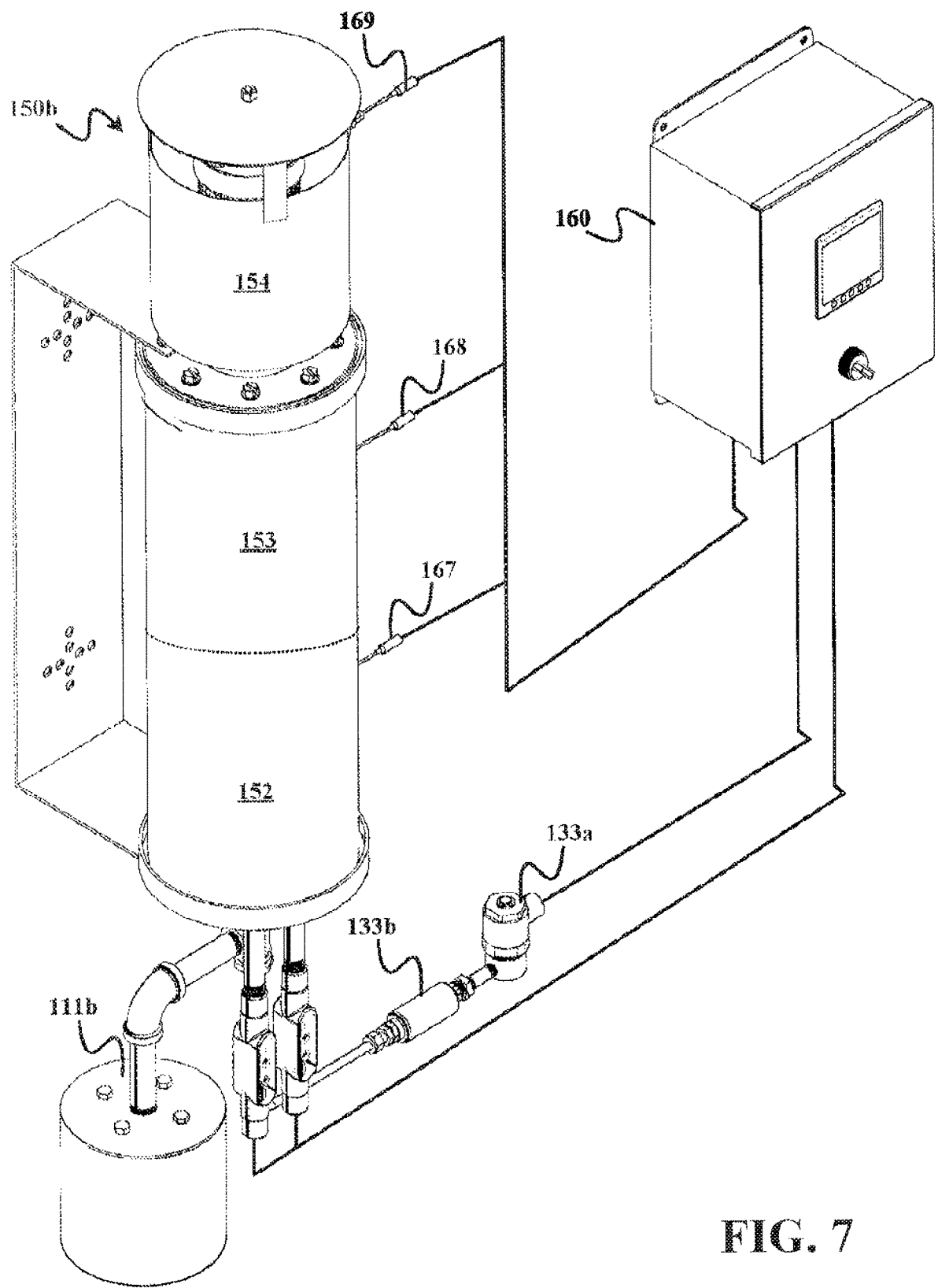
FIG. 7 illustrates a perspective view of a second exemplary embodiment of the thermal oxidization system of FIG. 2 in accordance with the inventive principles of the present disclosure.

To facilitate a further understanding of the inventions of the present disclosure, the following description of FIGS. 5-7 teach a couple of embodiments of the thermal oxidation system of FIG. 2. From this description; those having ordinary skill in the art will appreciate how to apply the inventive principles of the present disclosure for making and using numerous and various additional embodiments of thermal oxidization systems of the present disclosure.

Figure 5A:
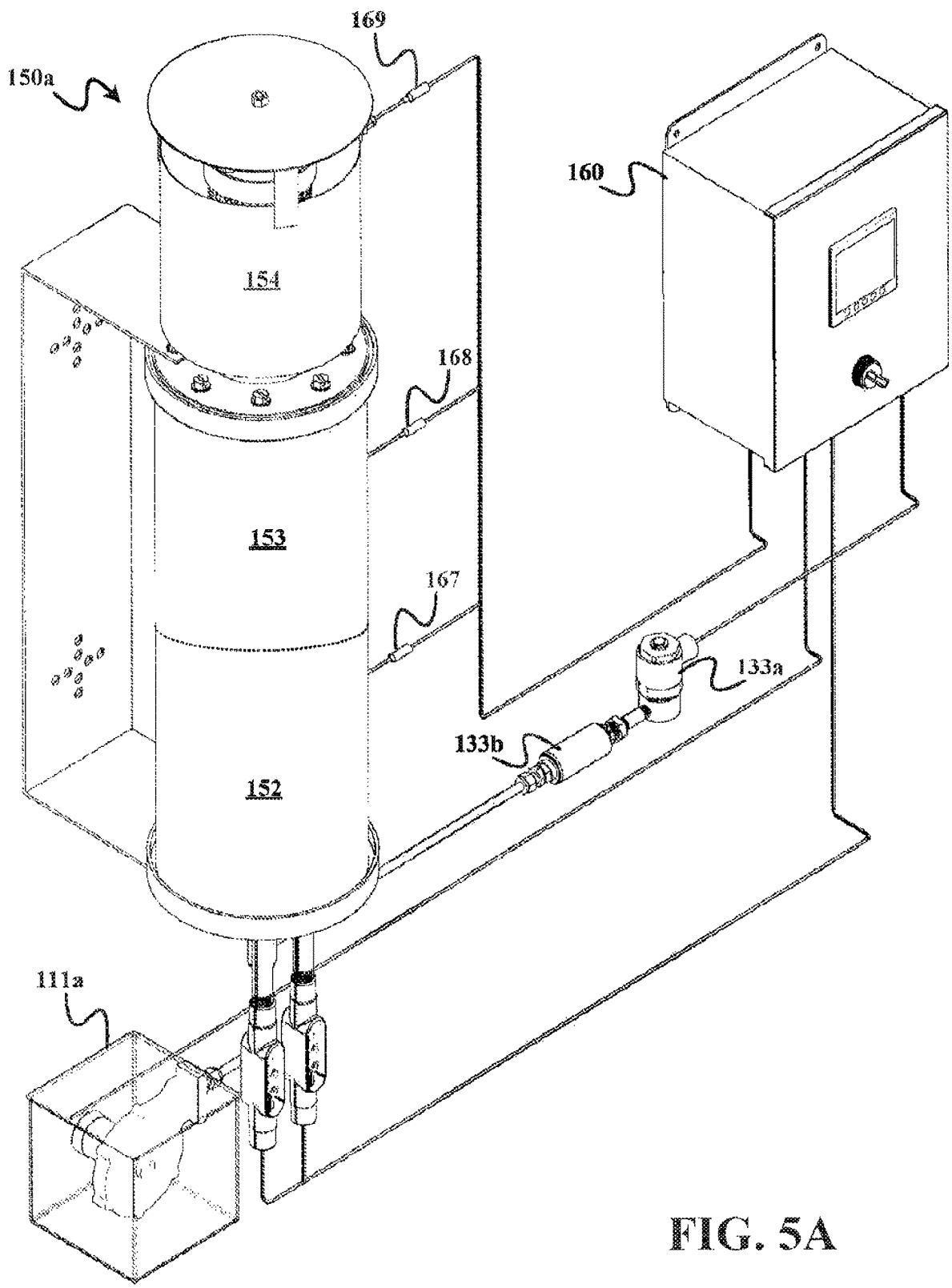
FIGS. 5A and 5B illustrate perspective views of a first exemplary embodiment of the thermal oxidization system of FIG. 2 in accordance with the inventive principles of the present disclosure.
Figure 5B:
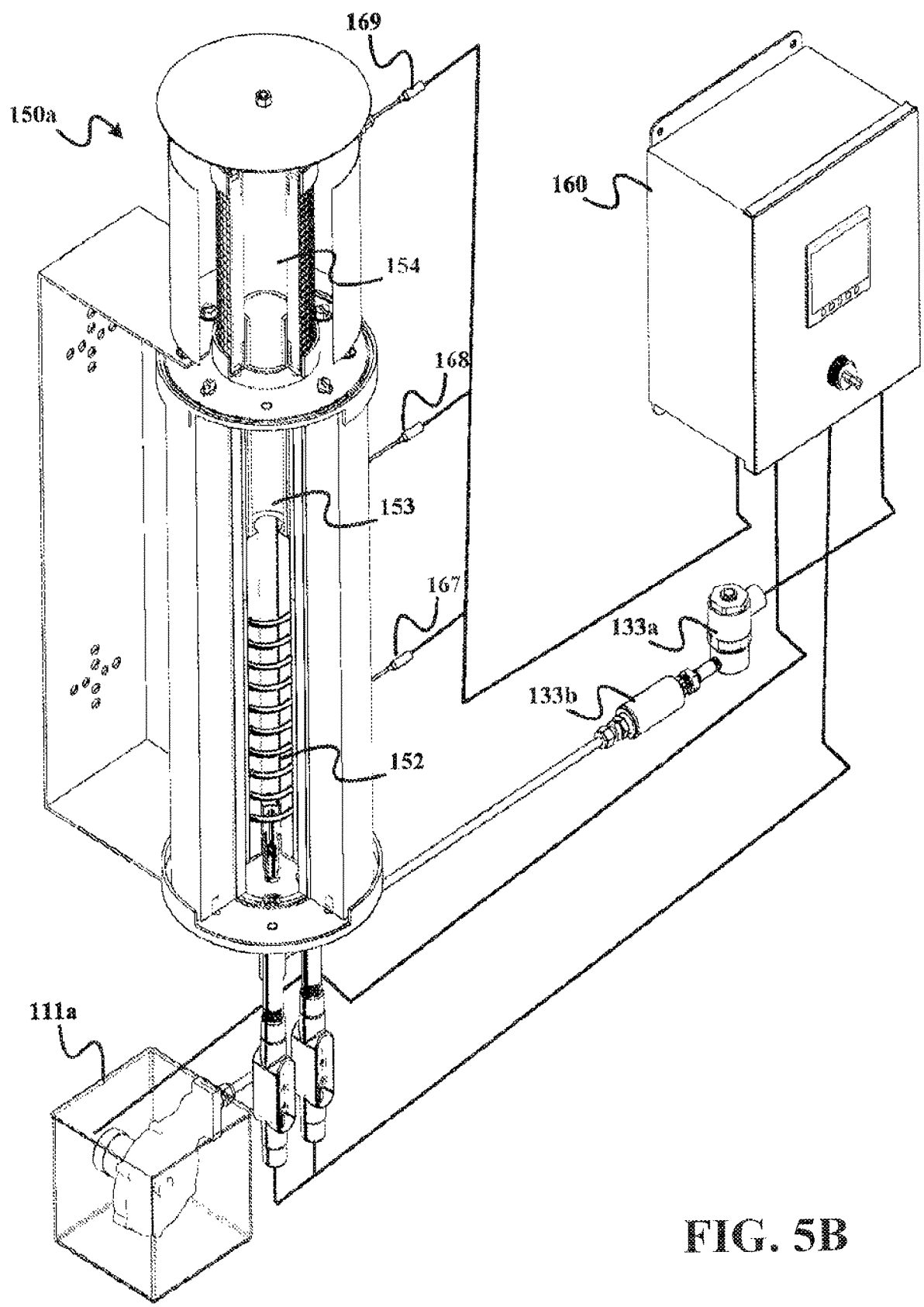

Referring to FIGS. 5A and 5B, an embodiment 150a of thermal oxidizer 50a (FIG. 2) employs:

1. oxidant supply 11 (FIG. 2) in the form of an air blower 111a;
2. oxidation mixer 51 (FIG. 2) in the form of a venturi air-gas mixer 151a (not shown in FIGS. 5A and 5B; shown in FIG. 6A);
3. a control flow conduit 33 in the form of a solenoid valve 133a equipped with a flame arrestor 133b;
4. oxidation chamber 52a (FIG. 2) in the form an oxidation chamber 152 including a cylindrical insulation blanket and a cylindrical thermal mass defining an oxidation fluid path with a spiral heating element 155 disposed within the oxidation fluid path;
5. retention chamber 53a (FIG. 2) in the form of a retention chamber 153 including a cylindrical insulation blanket and a cylindrical thermal mass 154b defining a retention fluid path;
6. heat dissipater 54a (FIG. 2) in the form of a heat dissipater 154;
7. a flash thermocouple 67 (FIG. 2) in the form of a flash thermocouple 167;
8. an oxidization thermocouple 68 (FIG. 2) in the form of an oxidization thermocouple 168; and
9. a vent thermocouple 69 (FIG. 2) in the form of a vent thermocouple 169.

Also shown in FIGS. 5A and 5B is a control box 160 as an embodiment of control box 60 (FIG. 3).

FIG. 6A provides a view of venturi air-gas mixer 151a.

FIG. 6B provides a view of a nozzle 151b of venturi air-gas mixer 151a, an interior wall of oxidization chamber 153, a heating element 155 helically disposed within interior wall of oxidization chamber 153 and an interior wall of retention chamber 154.

FIG. 6C provides a view of pleated heat exchanger 157 of heat dissipater 154 encircling a top portion of the interior wall of retention chamber 154.

Referring to FIG. 7, an embodiment 150b of thermal oxidizer 50a (FIG. 2) is a modification of thermal oxidizer 150a (FIG. 5A) involving a substitution of air blower 11 with a flashback preventer 111b.

Figure 8:
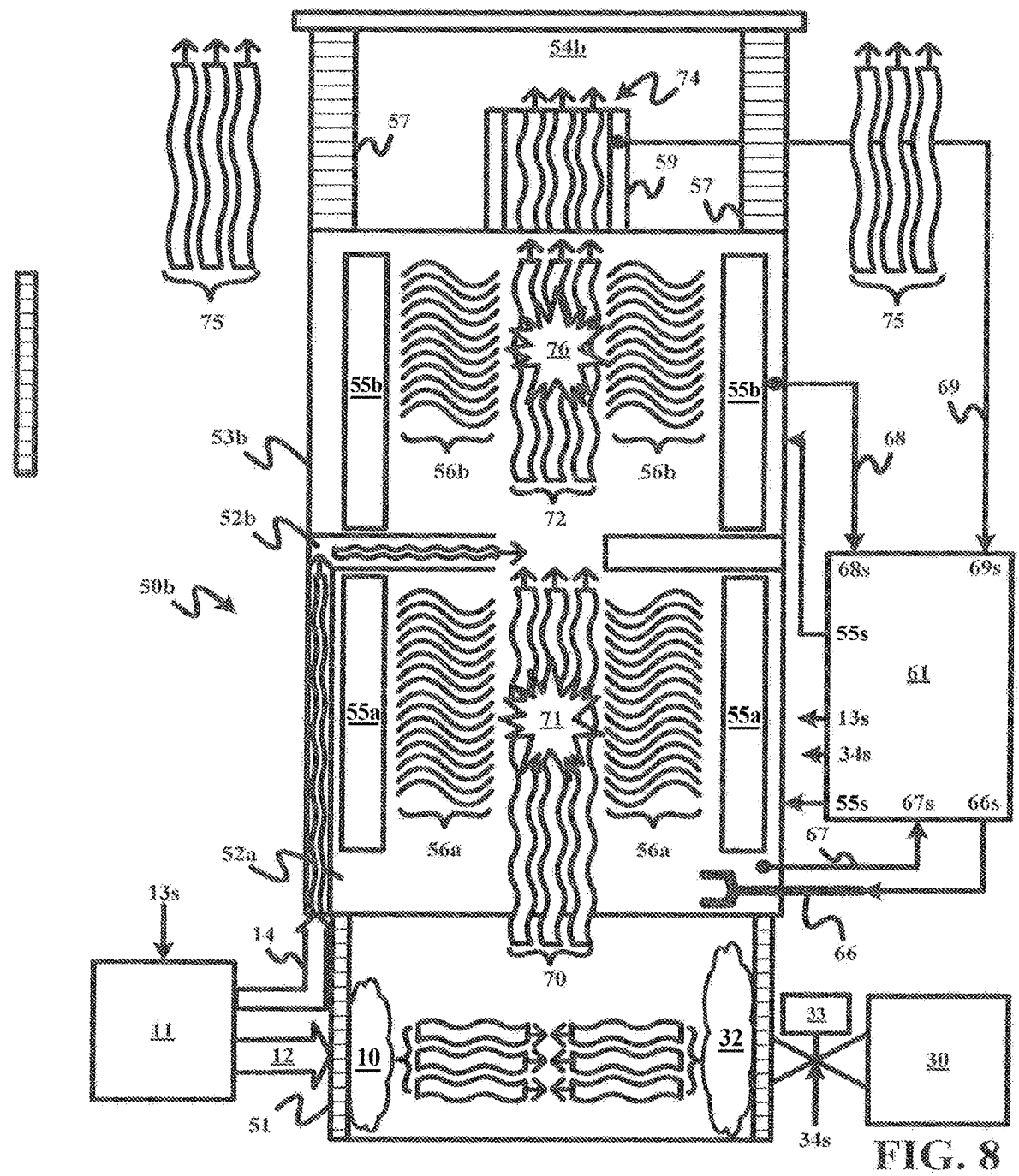
FIG. 8 illustrates a block diagram of a second exemplary embodiment of a thermal oxidization system in accordance with the inventive principles of the present disclosure.

To facilitate a further understanding of inventions of the present disclosure, the following description of FIG. 8 further teaches basic inventive principles of a thermal oxidization system and a thermal oxidization method of the present disclosure. From this description, those having ordinary skill in the art will appreciate how to apply the inventive principles of the present disclosure for making and using numerous and various embodiments of thermal oxidization systems and thermal oxidization methods of the present disclosure.

Referring to FIG. 8, a thermal oxidization system of the present disclosure incorporates a thermal oxidizer 50b employing oxidation mixer 51, an oxidation chamber 52a, a retention chamber 53b and a heat dissipater 54b forming a fluid flow path for an oxidation of a waste gas stream 32 (e.g., TRI gases) into oxidized combustion products 74 (e.g., oxidized gases 73 (FIG. 2) including $CO_2$, $H_2O$, $N_2$ and $O_2$).

As previously described, oxidation mixer 51 is structurally configured for mixing an oxidant 10 supplied by oxidant supply 11 (e.g., a blower or a pump) via a supply line 12 and a waste gas stream 32 (e.g., TRI gases) supplied by waste gas source 30 as controlled via a control flow conduit 33 (e.g., a solenoid valve and a flame arrestor in series coupling waste gas source 30 to oxidation mixer 51) into a combustible waste gas stream 70.

In one embodiment, oxidation mixer 51 is a venturi air-gas mixer whereby turbulent fluid flows of oxidant 10 and waste gas stream 32 into the venture air-gas mixer are controlled via oxidant supply 11 and control flow conduit 33 to ensure combustible waste gas stream 70 attains proportional concentrations of oxidant 10 and waste gas stream 32 within a flammable range (e.g., 11.5:1 oxidant 10 to waste gas stream 32). Additionally, oxidation mixer 51 may be equipped with a nozzle (not shown) for regulating a feeding of combustible waste gas stream 70 into oxidation chamber 52b whereby the nozzle may be structurally configured to generate more turbulence to combustible waste gas stream 70.

Oxidation chamber 52a is structurally configured for implementing a primary combustion reaction 71 therein of combustible waste gas stream 70 via a controlled emission of heat waves 56a by a heating element 55a. In one embodiment, oxidation chamber 52a is a refractory ceramic cylinder and heating element 55a is embedded within the walls of the refractory ceramic cylinder.

Optionally, oxidation chamber 52a may further employ a spark igniter 66 for a controlled ignition of combustible waste gas stream 70 at a proximal opening of oxidation chamber 52a. For this embodiment, if oxidization mixer 51 is equipped with a nozzle, then a distal tip of spark igniter 66 may be positioned within or adjacent to the flow of the combustible waste gas stream 70 out of the nozzle into oxidation chamber 52a.

Combustible waste gas stream 70a may fully or partially combust within oxidation chamber 52a. Oxidation chamber 52a therefore includes a supplement air inlet 52b for an additional flow of oxidant 10 via oxidant supply line 14 or via atmosphere to supplement the oxygenated waste gas stream 72 flowing into retention chamber 53b.

Retention chamber 53b is structurally configured for implementing a secondary combustion reaction 76 therein oxygenated waste gas stream 72 via a controlled omission of heat waves 56b by a heating element 55b. In one embodiment, retention chamber 53b is a refractory ceramic cylinder and heating element 55b is embedded within the walls of the refractory ceramic cylinder integrated with oxidation chamber 53b as shown. Retention chamber 53b ensures a complete oxidation of oxygenated waste gas stream 72 into heated oxidized combustion products 74 (e.g., oxidized gases 73 (FIG. 2) including $CO_2$, $H_2O$, $N_2$ and $O_2$).

Heat dissipater 54b is structurally configured for implementing a heat exchange with heated oxidized combustion products 74 to vent cooled oxidized combustion products 74 into the atmosphere. In one embodiment, heat dissipater 54b includes a nozzle 59 having a cylindrical shape whereby oxidized combustion products 74 exits heat dissipater 54b along a length and circumference of heat exchanger 57 with cooling atmosphere air 75 being directed vertically past heat exchanger 57 to thereby extract heat from heat exchanger 57.

The thermal oxidization system of FIG. 8 further incorporates a control system employing an oxidation controller 61, a data logger 63 (FIG. 3) and a data reporter 65 (FIG. 3) housed within a control box 60 (FIG. 3).

Oxidation controller 61 is structurally configured for controlling an operation of thermal oxidizer 50b in accordance with the thermal oxidization method of FIGS. 4A-4C as previously described herein. More particularly, heating elements 55a and 55b are controlled via a similar scheme as heating element 55 (FIG. 2).

In practice, oxidation controller 61 may be omitted whereby the heating elements 55 of thermal oxidizer 50a (FIG. 2) and thermal oxidizer 50b (FIG. 8) may be operated via an on/off switch.

Also in practice, oxidation controller 61 may implement a variation of the thermal oxidization method 90 (FIGS. 4A-4C) excluding the heat dissipater thermocouple 69 and involving the oxidation chamber thermocouple 67 and/or the retention chamber thermocouple 68. For such an embodiment, a one loop or a two loop proportional-integral-derivative ("PID") control may be implemented by oxidation controller 61 involving a zero crossover regulation of the heating element(s) 55 via heating regulation signal HR.

Figure 9:
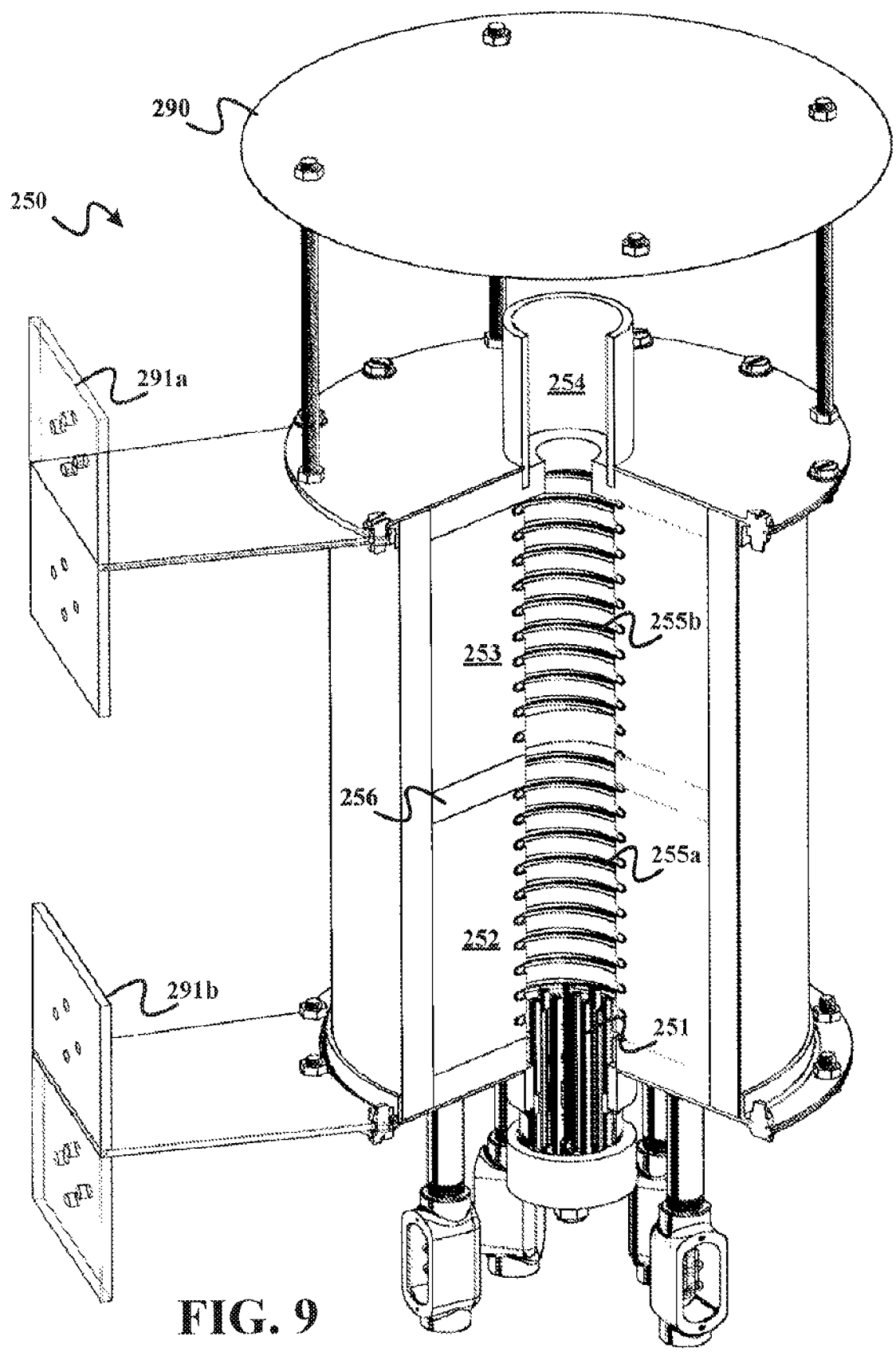
FIG. 9 illustrates a perspective view of an exemplary embodiment of the thermal oxidizer of FIG. 8 in accordance with the inventive principles of the present disclosure.

To facilitate a further understanding of the inventions of the present disclosure, the following description of FIGS. 9-10 teach a couple of embodiments of the thermal oxidation system of FIG. 8. From this description, those having ordinary skill in the art will appreciate how to apply the inventive principles of the present disclosure for making and using numerous and various additional embodiments of thermal oxidization systems of the present disclosure.

Referring to FIG. 9, an embodiment 250 of thermal oxidizer 50b (FIG. 8) employs:

1. an oxidation mixer nozzle 251 having an air inlet on a side wall and a bottom gas inlet;

2. oxidation chamber 52a (FIG. 8) in the form an oxidation chamber 252 including a cylindrical insolation blanket and a cylindrical thermal mass defining an oxidation fluid path with a spiral heating element 255a encircling the oxidation fluid path;

3. retention chamber 53b (FIG. 8) in the form of a retention chamber 253 including an insulation blanket and a thermal mass defining a retention fluid path with a spiral heating element 255b encircling the oxidation fluid path;

4. heat dissipater 54b (FIG. 10A) in the form of a heat dissipater 254 having a rain cap 290 (FIG. 9); and 5. mounting brackets 291a and 291b.

Thermocouples may or may not be incorporated dependent upon the control scheme.

Figure 10A:
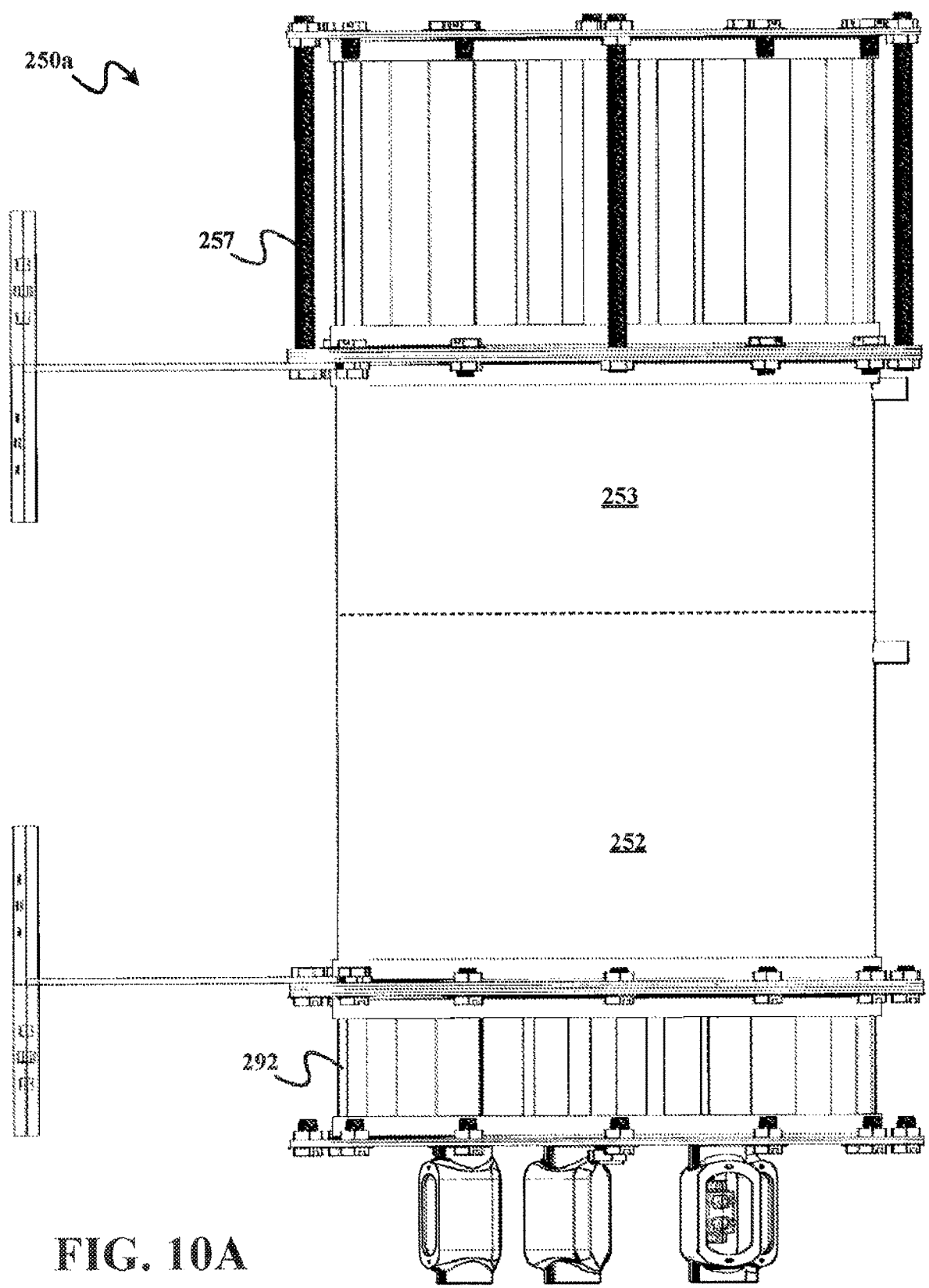
FIG. 10A illustrates an exemplary atmospheric embodiment of the thermal oxidizer of FIG. 9.

For example, FIG. 10A illustrates an atmospheric version 250a of thermal oxidizer 250 (FIG. 9) involving a non-force flow of atmospheric air into the thermal oxidizer 250a and an on/off control of the heating elements. A heat exchanger 257 provides for heat exchange and back flash protection of the heat dissipater, and a back flash 292 protects a back flash of the oxidation mixer.

Figure 10B:
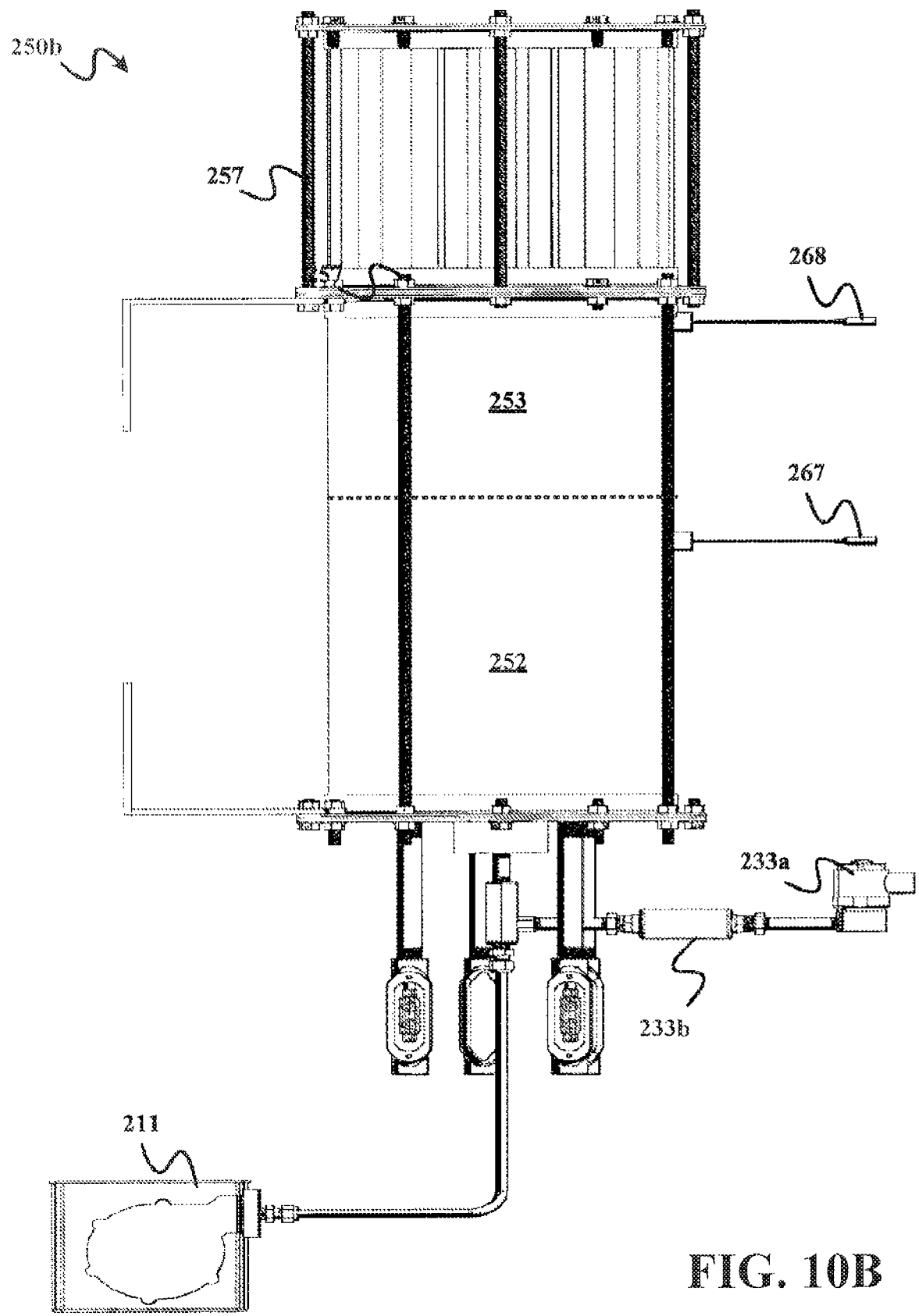
FIG. 10B illustrates an exemplary forced air embodiment of the thermal oxidizer of FIG. 9.

By further example, FIG. 10B illustrates a force-air version 250b of thermal oxidizer 250 (FIG. 9) incorporating an air blower 211, a solenoid valve 233a, a flash arrestor 233b, an oxidation thermocouple 267 and a retention thermocouple 268.

Referring to FIGS. 1-10, those having ordinary skill in the art of the present disclosure will appreciate various advantages of the inventions of the present disclosure including, but not limited to:

1. an active or passive control of an efficient thermal combustion of toxic release inventories gases ("TRI"), particularly in compliance with applicable environment regulations; and 2. data logging and data reporting of the active control of the thermal combustion of TRI.

To further facilitate an understanding of inventions of the present disclosure, the following description of FIGS. 11-14 teach basic inventive principles of a gas fired based thermal oxidization systems and gas fired based thermal oxidization methods of the present disclosure. From this description, those having ordinary skill in the art will appreciate how to apply the inventive principles of the present disclosure for making and using additional numerous and various embodiments of gas fired based thermal oxidization systems and gas fired based thermal oxidization methods of the present disclosure.

Figure 11:
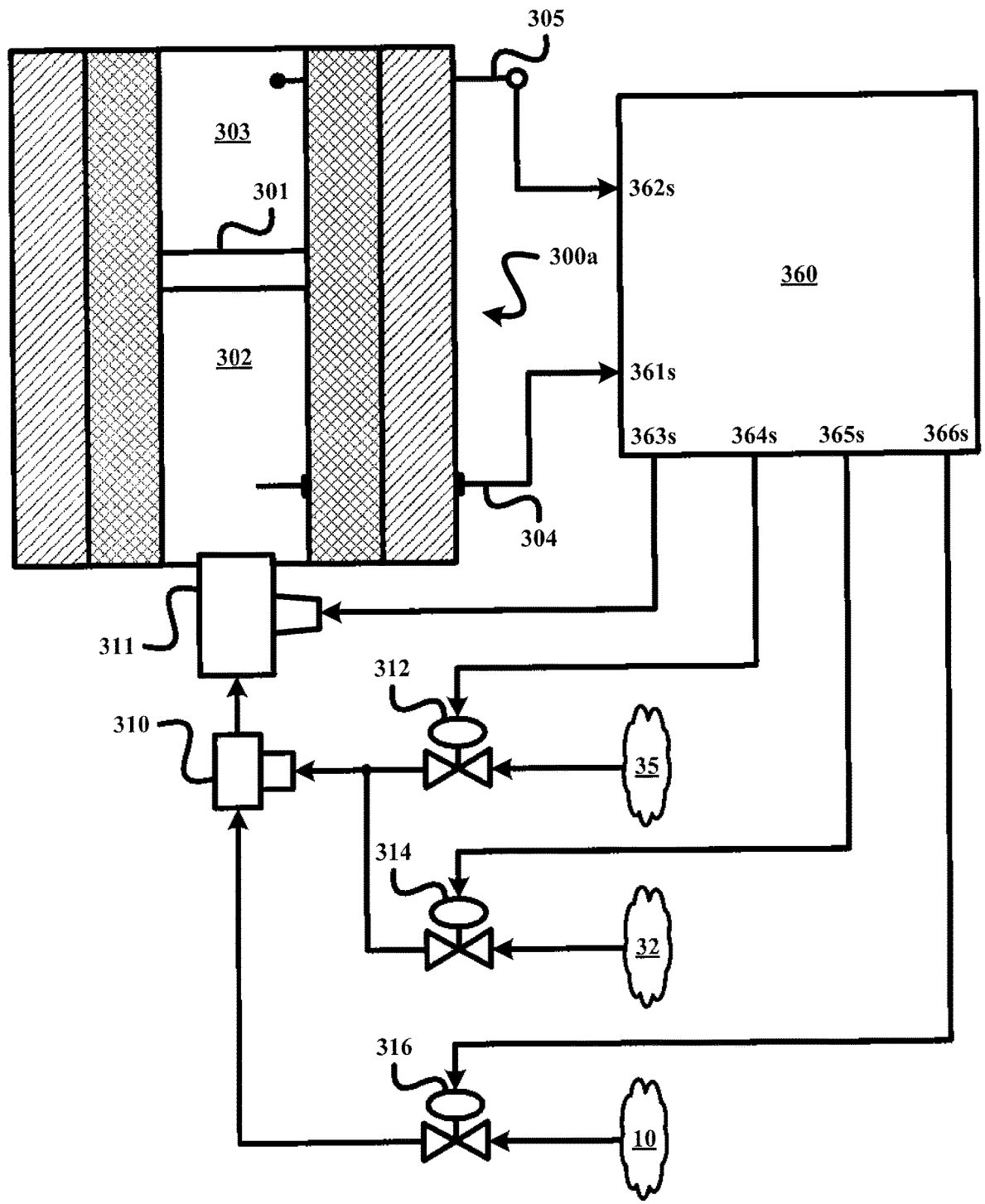
FIG. 11 illustrates a first exemplary embodiment of a gas fired thermal oxidizer in accordance with the inventive principles of the present disclosure.

Referring to FIG. 11, an exemplary embodiment of a gas fired thermal oxidization system of the present disclosure incorporates a thermal oxidizer 300 employing an oxidation mixer 310 in the form of a venturi air-gas mixer, an oxidization chamber 302, a retention chamber 303 and a heat dissipater (not shown) forming a fluid flow path for oxidation of a waste gas stream (e.g., TRI gases) into oxidized combustion products (e.g., oxidized gases including $CO_2$, $H_2O$, $N_2$ and $O_2$). As will be subsequently described in more detail herein, a gas fire based thermal oxidization method of the present disclosure represented by a flowchart 400 (FIG. 12) implements an operation of thermal oxidizer 300 involving an ignition phase as best shown in FIG. 13A for heating up chambers 302, 303 and a combustion phase as best shown in FIG. 13B for generating oxidized combustion products.

Oxidation mixer 310 is structurally configured for implementing an ignitable mixture of an oxidant 10 and natural gas 35 during the ignition phase of the thermal oxidization method. The oxidant 10 is supplied to oxidation mixer 310 by an oxidant supply (not shown) (e.g., a blower or a pump) as controlled via a control flow conduit 312 (e.g., a solenoid and a modulation value in series coupling the oxidant supply to oxidation mixer 310). The natural gas 35 is supplied to oxidation mixer 310 by a natural gas source and a flame arrestor (not shown) as controlled via a control flow conduit 314 (e.g., a solenoid valve and a modulation value in series coupling the natural gas source to oxidation mixer 310).

Oxidation mixer 310 is further structurally configured for implementing a combustible mixture of oxidant 10 and waste gas 32 during the combustion phase of the thermal oxidization method. Again, oxidant 10 is supplied to oxidation mixer 310 by an oxidant supply (not shown) (e.g., a blower or a pump) as controlled via a control flow conduit 312 (e.g., a solenoid valve and a flame arrestor in series coupling the oxidant supply to oxidation mixer 310). The waste gas 32 is supplied to oxidation mixer 310 by a waster gas source and a flame arrestor (not shown) as controlled via a control flow conduit 315 (e.g., a solenoid valve and a modulation value in series coupling the waste gas source to oxidation mixer 310).

In one exemplary embodiment, oxidation mixer 310 is a venturi air-gas mixer whereby turbulent fluid flows of oxidant 10 and waste gas 32 into the venture air-gas mixer are controlled via control flow conduits 312 and 316 to ensure proportional concentrations of oxidant 10 and waste gas stream 32 within a flammable range (e.g., 11.5:1 oxidant 10 to waste gas stream 32).

Still referring to FIG. 11, oxidation mixer 310 is equipped with a burner nozzle 311 having a mounted spark igniter for igniting the ignitable mixture of oxidant 10 and natural gas 35 via oxidation mixer 310 during the ignition phase of the thermal oxidization method.

During the combustion phase of the thermal oxidization method, burner nozzle 311 is further structurally configured for generating turbulence to the combustible mixture of oxidant 10 and waste gas 32 (i.e., a combustible waste gas stream) via oxidation mixer 310 and for regulating a feeding of the combustible mixture of oxidant 10 and waste gas 32 into oxidation chamber 302.

Still referring to FIG. 11, during the ignition phase of the thermal oxidization method, oxidation chamber 302 and retention chamber 303 are structurally configured to absorb a flame generated by oxidization mixer 310 and burner nozzle 311 for elevating a thermal mass temperature within the chambers 302, 303 above a thermal mass combustion threshold (e.g., >1450° F.).

During the combustion phase of the thermal oxidization method, oxidation chamber 302 is further structurally configured for implementing a primary combustion reaction 71$a$ therein of the combustible waste gas stream 10, 32 into an oxygenated waste gas stream, and retention chamber 303 is structurally configured for implementing a retention time for a secondary combustion reaction 71$b$ of the oxygenated waste gas stream into heated oxidized combustion products (e.g., oxidized gases including $CO_2$, $H_2O$, $N_2$ and $O_2$).

In one exemplary embodiment, oxidation chamber 302 and retention chamber 303 are integrally formed as a refractory ceramic cylinder with a diffuser 301 separating the chambers 302, 303.

Still referring to FIG. 11, the heat dissipator (not shown) may be structurally configured for implementing a heat exchange of atmosphere air with heated oxidized combustion products to vent cooled oxidized combustion products into the atmosphere. Alternatively, the heat dissipator may be structurally configured for implementing a vaporizing of oxidized combustion products 74 for a subsequent venting of some of the products to atmosphere (e.g., oxidized gases $N_2$ and $O_2$) and for a subsequent capture and storage of other products (e.g., oxidized gas $CO_2$).

Still referring to FIG. 11, the thermal oxidization system of the present disclosure further incorporates a control system employing an oxidation controller 360, a data logger (not shown) and a data reporter (not shown).

Figure 12:
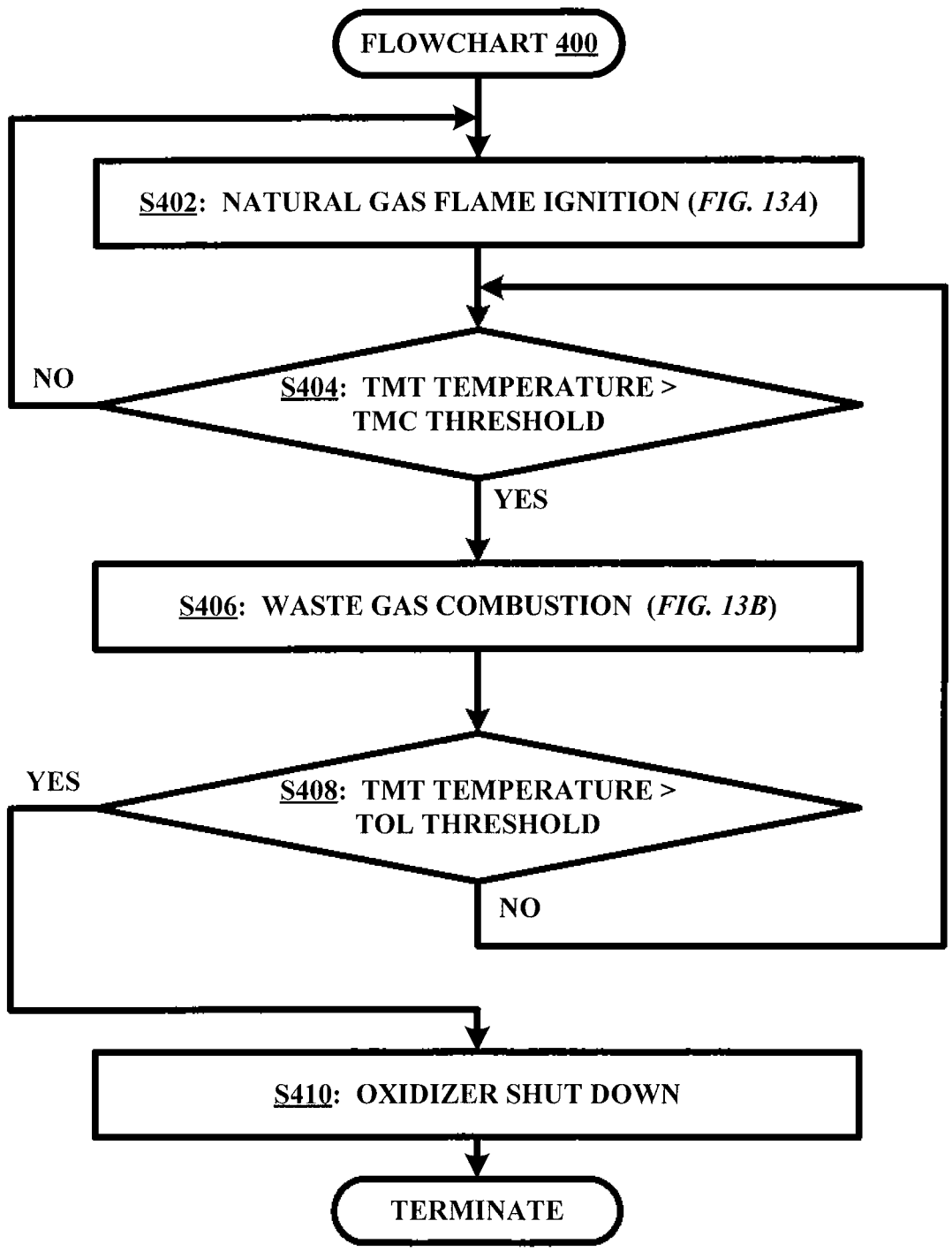
FIG. 12 illustrates a flowchart representative of an exemplary embodiment of a gas fired thermal oxidization method in accordance with the inventive principles of the present disclosure.
Figure 13A:
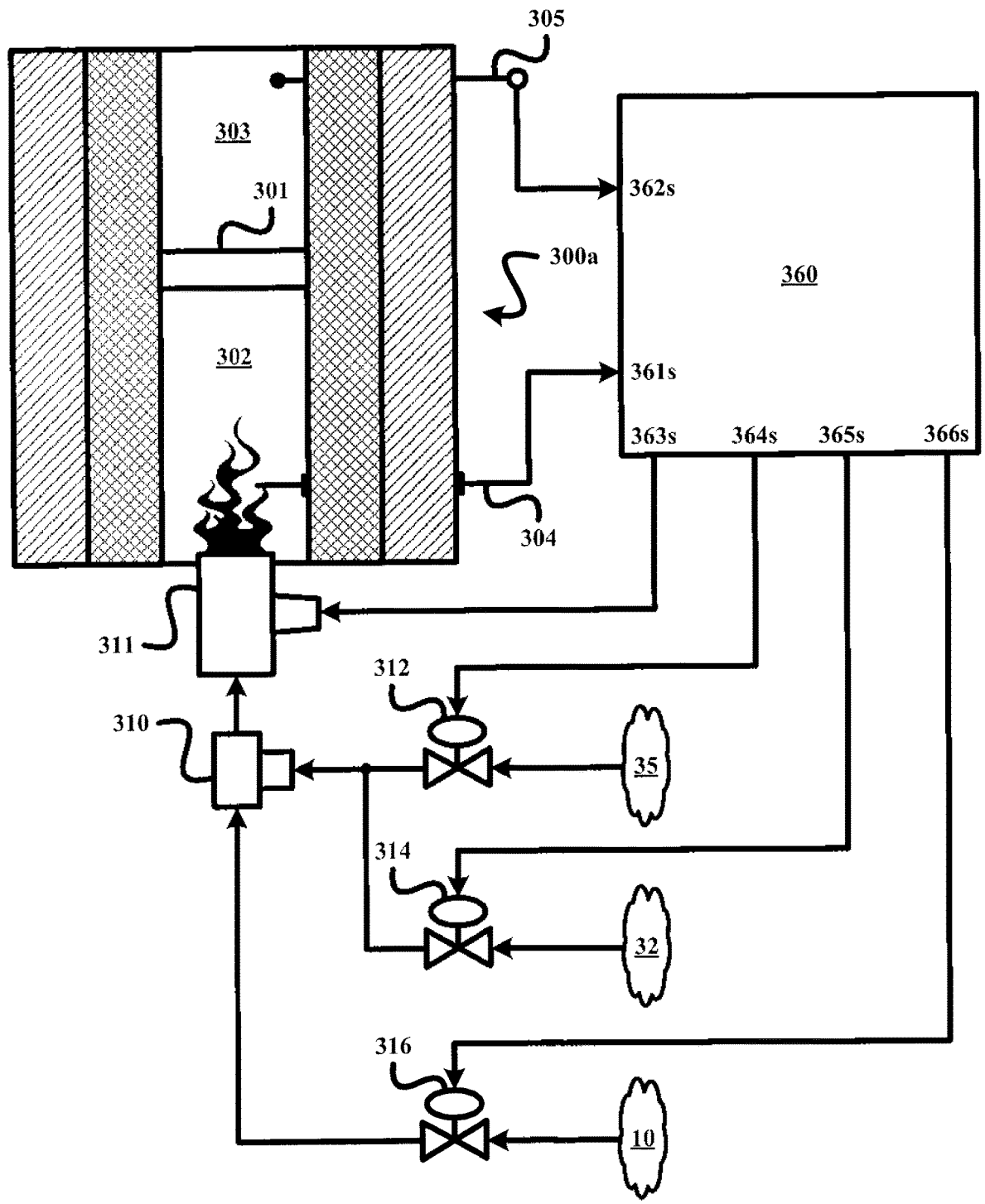
FIG. 13A illustrates an exemplary ignition phase of the flowchart of FIG. 12.
Figure 13B:
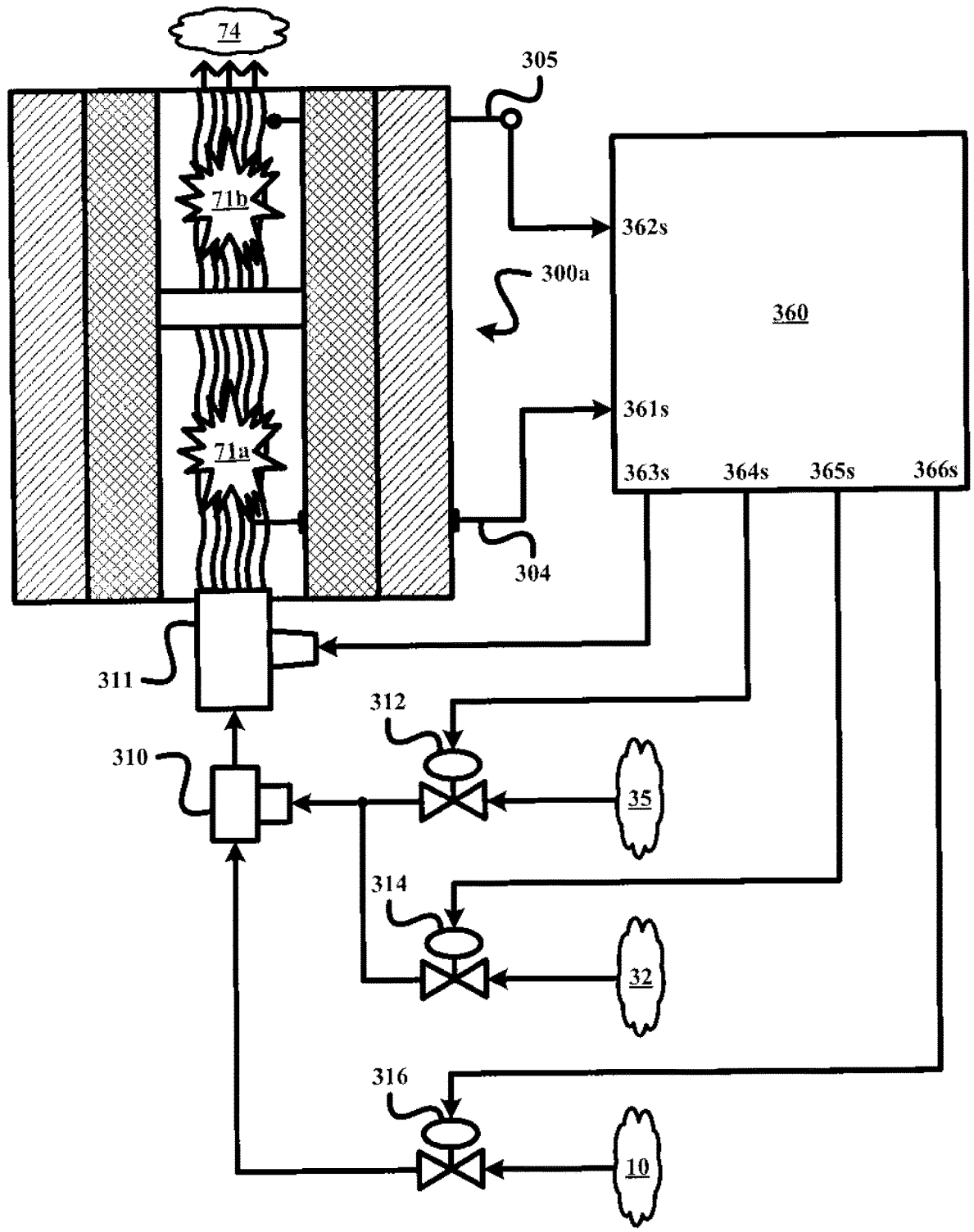
FIG. 13B illustrates an exemplary combustion phase of the flowchart of FIG. 12.

Oxidation controller 360 is structurally configured for controlling an operation of thermal oxidizer 300 as will be further described herein in connection with a description of flowchart 400 of FIG. 12.

In one exemplary embodiment, oxidation controller 360 is an application specific main board or an application specific integrated circuit for controlling a thermal oxidation application of various inventive principles of the present disclosure as subsequently described herein in connection with FIG. 12. The structural configuration of oxidation controller 360 may include, but is not limited to, processor(s), computer-usable/computer readable storage medium(s), an operating system, application module(s), peripheral device controller(s), slot(s) and port(s). Each application module consists of an electronic circuit and/or an executable program (e.g., executable software and/or firmware stored on non-transitory computer readable medium(s)) for controlling an execution of the thermal oxidation application.

A non-limiting example of oxidation controller 360 is an all-in-one XL4 controller sold by Homer APG of Indianapolis, Indiana that is configured in accordance with the inventive principles of the present disclosure.

The data logger is structurally configured for logging operational data transmitted by oxidation controller 360 to the data logger via a push or pull operation, or by a monitoring of specific data points of oxidation controller 360 by the data logger. The operational data includes data informative of an operational status of thermal oxidizer 300 in executing the oxidation of waste gas stream 32.

In one exemplary embodiment, the data logger is an application specific main board or an application specific integrated circuit for controlling a data logging application of the present disclosure. The structural configuration of the data logger may include, but is not limited to, processor(s), computer-usable/computer readable storage medium(s), an operating system, application module(s), peripheral device controller(s), slot(s) and port(s). Each application module consists of an electronic circuit and/or an executable program (e.g., executable software and/or firmware stored on non-transitory computer readable medium(s)) for executing the data logging application.

A non-limiting example of the data logger is an all-in-one XLE controller sold by Homer APG of Indianapolis, Indiana that is configured in accordance with the inventive principles of the present disclosure. Another non-limiting example of the data logger is as an application module configured within oxidation controller 360.

Also in practice, the data logger may be omitted and oxidation controller 360 may be configured for executing the data logging application of the present disclosure.

The data reporter 65 is structurally configured for receiving reporting data from the data logger via a push or pull operation and transmitting the reporting data to a network (e.g., a cellular network). The reporting data is the operational data processed by the data logger into a reporting format associated with the data reporter.

In one embodiment, the data reporter is an application specific modem for executing a data reporting application of the present disclosure.

A non-limiting example of the data logger 66 is a SonicU™ modem sold by SonicU, LLC of Greenfield, Indiana that is configured in accordance with the inventive principles of the present disclosure.

Referring back to FIG. 11, oxidation controller 360 regulates a control of thermal oxidizer 300 in accordance with the thermal oxidization method of the present disclosure as represented by a flowchart 400 shown in FIG. 12. In support of executing the thermal oxidization method, (a) oxidation controller 360 senses and controls the generation of the flame via a connection of a flame detector 304 within combustion chamber 302 at a signal input 361$s$ of oxidization controller 360, (b) oxidation controller 360 senses and controls a thermal mass temperature of retention chamber 303 via a connection of a thermocouple 305 within retention chamber 303 at a signal input 362$s$, (c) oxidation controller 360 controls an activation and a deactivation of the spark igniter of burner nozzle 311 via a signal output 363$s$, (d) oxidation controller 360 controls a feeding rate of natural gas 35 into oxidation mixer 310 via a connection of a signal output 364$s$ to control flow conduit 312, (e) oxidation controller 360 controls a feeding rate of waste gas 32 into oxidation mixer 310 via a connection of a signal output 365$s$ to control flow conduit 314, and (f) oxidation controller 360 controls a feeding rate of oxidant 10 into oxidation mixer 310 via a connection of a signal output 366s to control flow conduit 316.

Referring to FIGS. 11 and 12, prior to be oxidation controller 360 being powered-on, control flow conduits 312, 314, 316 are closed. Upon oxidation controller 360 being powered-on, oxidation controller 360 initiates a thermocouple validity check of thermocouple 305 involving a comparison by oxidation controller 360 of a thermal mass temperature of retention chamber 303 as sensed by thermocouple 305 to a thermocouple validity threshold. In practice, to test the validity of the thermocouple 305, the thermocouple validity threshold should be set at an anticipated maximum room temperature (e.g., 22° C.) or to an anticipated maximum local outdoor air temperature.

For the thermocouple validity test, if the thermal mass temperature of retention chamber 303 is more than the thermocouple validity threshold, then oxidation controller 360 is powered down for a maintenance inspection of thermocouple 305 and powered on again after a successful repair/replacement, if any, of the thermocouple 305.

Otherwise, if the thermal mass temperature of retention chamber 303 is equal to or less than the thermocouple validity threshold, then oxidation controller 360 initiates a thermal oxidation limit check involving a comparison by oxidation controller 360 of a thermal mass temperature of retention chamber 303 as sensed by thermocouple 305 to a thermal oxidation limit threshold.

In practice, to ensure a safe heat activation of chambers 302, 303, the thermal oxidation limit threshold should represent a predefined maximum temperature of retention chamber 303 prior to the heat activation of thermal oxidizer 300 (e.g., 300° C.) for all thermocouple limit thresholds).

For the thermal oxidation limit check, if the thermal mass temperature of retention chamber 303 is more than the thermal oxidation limit threshold, then oxidation controller 360 is powered down for a cooling period whereby oxidation controller 360 may be powered up again upon expiration of the cooling period to re-execute the thermal oxidation limit check.

Otherwise, if the thermal mass temperature of retention chamber 303 is equal to or less than the thermal oxidation limit threshold, then oxidation controller 360 executes a stage S402 of flowchart 400 encompassing a natural gas flame ignition involving (a) an activation of the spark igniter of burner nozzle 311 via signal output 363s, (b) a controlled feeding rate of natural gas 35 into oxidation mixer 310 via signal output 364s, and (c) a controlled feeding rate of oxidant 10 into oxidation mixer 310 via signal output 366s.

Referring to FIGS. 12 and 13A, during stage S402, to reach a thermal combustion threshold (e.g., 1450° F.), oxidation controller 360 may implement a modulation of the natural gas flame ignition involving (a) an increase in the feeding rate of natural gas 35 into oxidation mixer 310 as the thermal mass temperature of retention chamber 303 decreases, (b) a decrease in the feeding rate of natural gas 35 into oxidation mixer 310 as the thermal mass temperature of retention chamber 303 increases, (c) an increase in the feeding rate of oxidant 10 into oxidation mixer 310 as the thermal mass temperature of retention chamber 303 increases and (d) a decrease in the feeding rate of oxidant 10 into oxidation mixer 310 as the thermal mass temperature of retention chamber 303 decreases.

In practice of stage S402, any increase or decrease of the feeding rate of natural gas 35 into oxidation chamber 310 is inversely proportional to any increase or decrease of the thermal mass temperature of retention chamber 303, and any increase or decrease of the feeding rate of natural gas 35 into oxidation chamber 310 is directly proportional to any increase or decrease of the thermal mass temperature of retention chamber 303.

Upon the thermal mass temperature of retention chamber 303 being more than a thermal mass combustion threshold as determined by oxidation controller 360 during a stage S404 of flowchart 400, oxidation controller 360 executes a stage S406 of flowchart 400 encompassing a waste gas combustion involving (a) a deactivation of the spark igniter of burner nozzle 311 via signal output 363s, (b) a reduced feeding rate of natural gas 35 into oxidation mixer 310 via signal output 364s or a closing of control flow conduit 312 via signal output 364s, (c) a controlled feeding rate of waste gas 32 into oxidation mixer 310 via signal output 365s, and (d) a controlled feeding rate of oxidant 10 into oxidation mixer 310 via signal output 366s.

Referring to FIGS. 12 and 13B, during stage S406, to maintain a constant thermal mass temperature of retention chamber 303 (e.g., 1450° F.), oxidation controller 360 may implement a modulation of the waste gas combustion involving (a) a closing of control flow conduit 314 into oxidation mixer 310 via output signal 365s when the thermal mass temperature of retention chamber 303 is more than the constant thermal mass temperature of retention chamber 303 and (b) an increase in the feeding rate of oxidant 10 into oxidation mixer 310 via output signal 366s when the thermal mass temperature of retention chamber 303 is more than the constant thermal mass temperature of retention chamber 303.

Also during stage S406, if the thermal mass temperature of retention chamber 303 becomes more than the thermal oxidation limit threshold as determined by oxidation controller 360 during a stage S408 of flowchart 400, the oxidation controller 360 executes a stage S410 of flowchart 400 encompassing an oxidizer shut down involving (a) a continued deactivation of the spark igniter of burner nozzle 311 via signal output 363s, (b) a closing of control flow conduit 312 into oxidation mixer 310 via output signal 364s, (c) a closing of control flow conduit 314 into oxidation mixer 310 via output signal 365s, and (d) a closing of control flow conduit 316 into oxidation mixer 310 via output signal 366s.

Otherwise, oxidation controller 360 will continue to execute stages S402-S408 as a function of the thermal mass temperature of retention chamber 303 as previously described herein for stages S402-S408.

Figure 14:
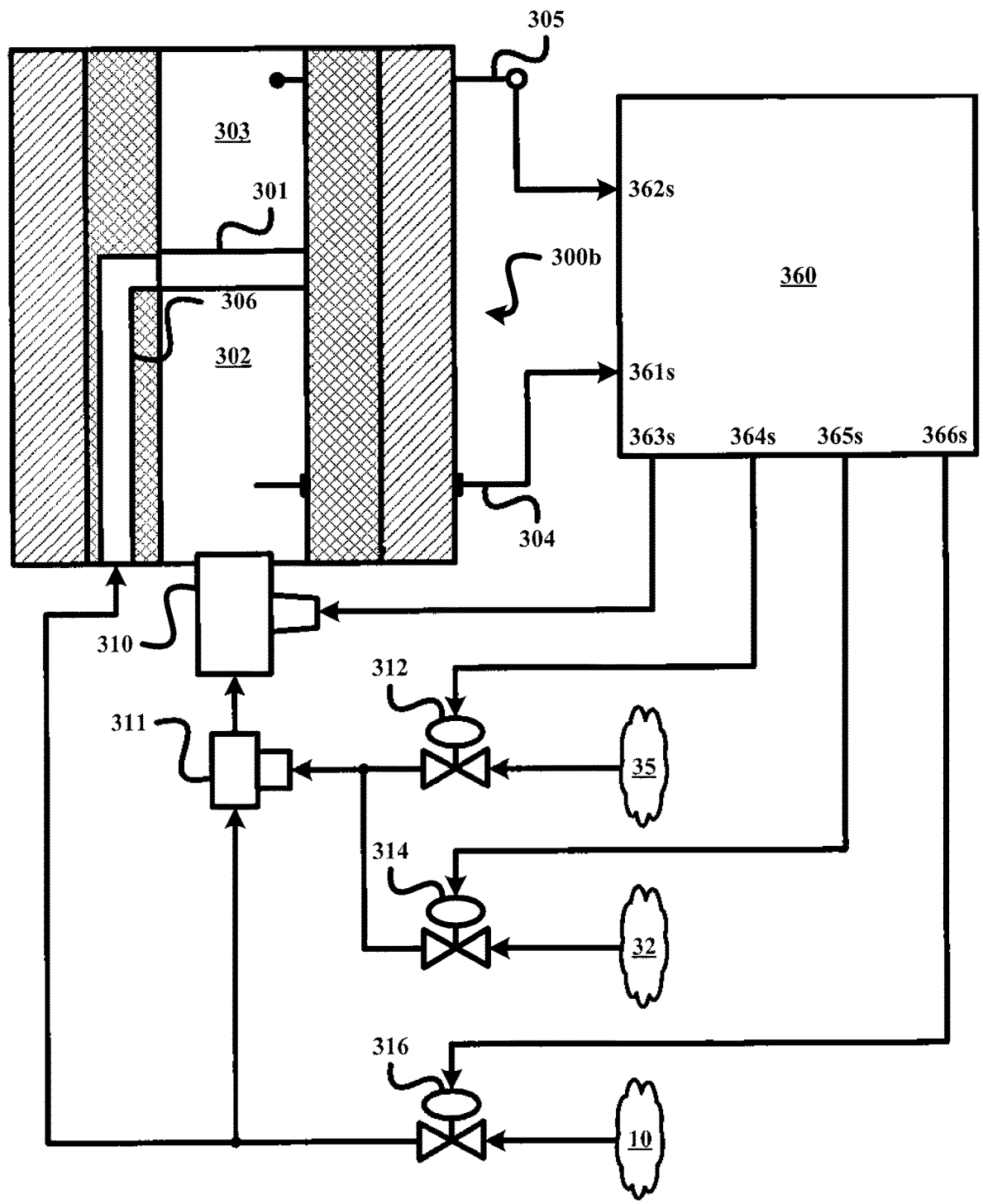
FIG. 14 illustrates a second exemplary embodiment of a gas fired thermal oxidizer in accordance with the inventive principles of the present disclosure.

Referring to FIG. 14, a thermal oxidizer 300' is a version of thermal oxidizer 300 (FIG. 11) that includes a supplement air inlet 306 for an additional flow of oxidant 10 via control flow conduit 316 as shown or via atmosphere to supplement the oxygenated waste gas stream flowing into retention chamber 303.

Figure 15:
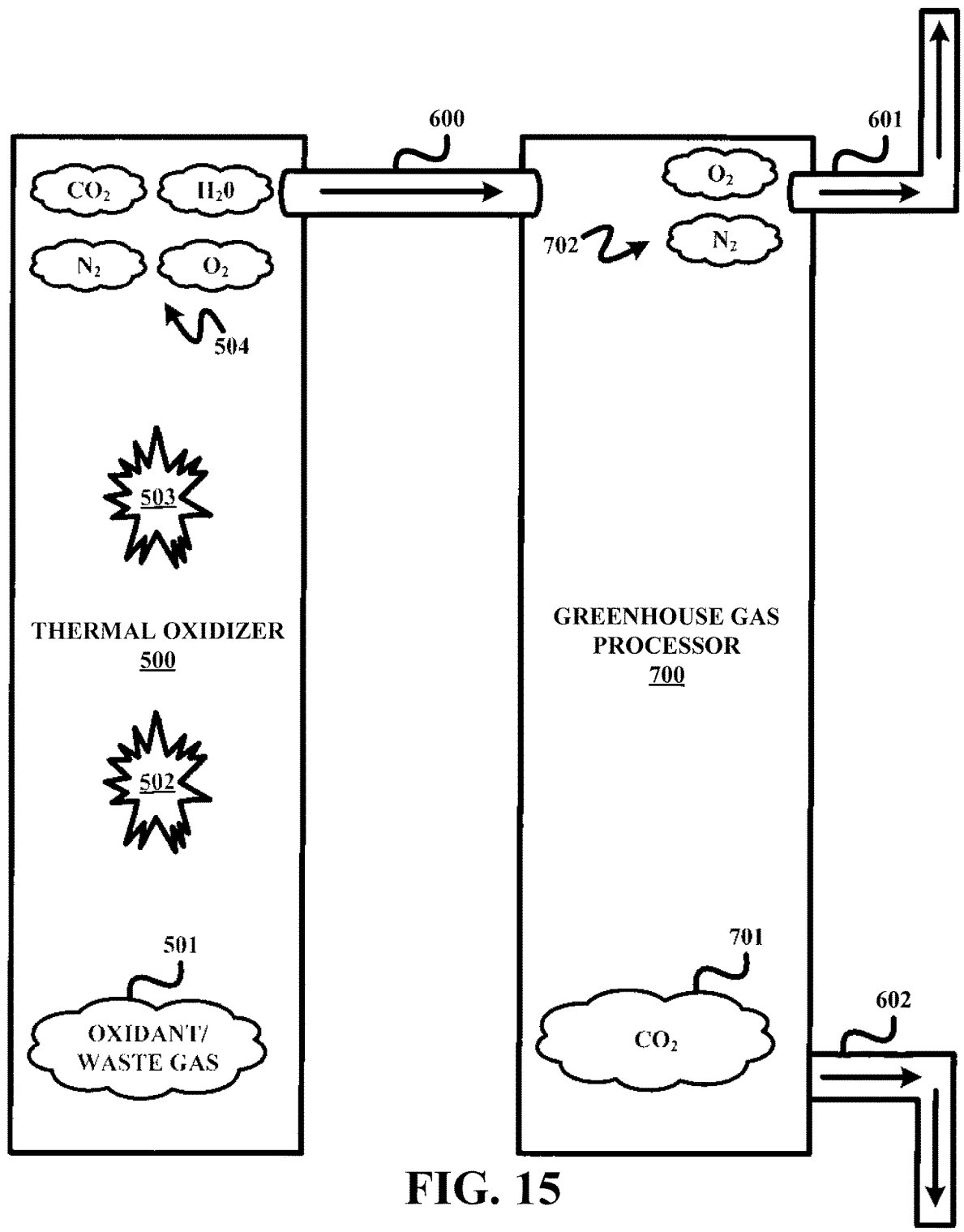
FIG. 15 illustrates an exemplary embodiment of greenhouse gas processor based thermal oxidation system of the present disclosure in accordance with the inventive principles of the present disclosure.
Figure 16:
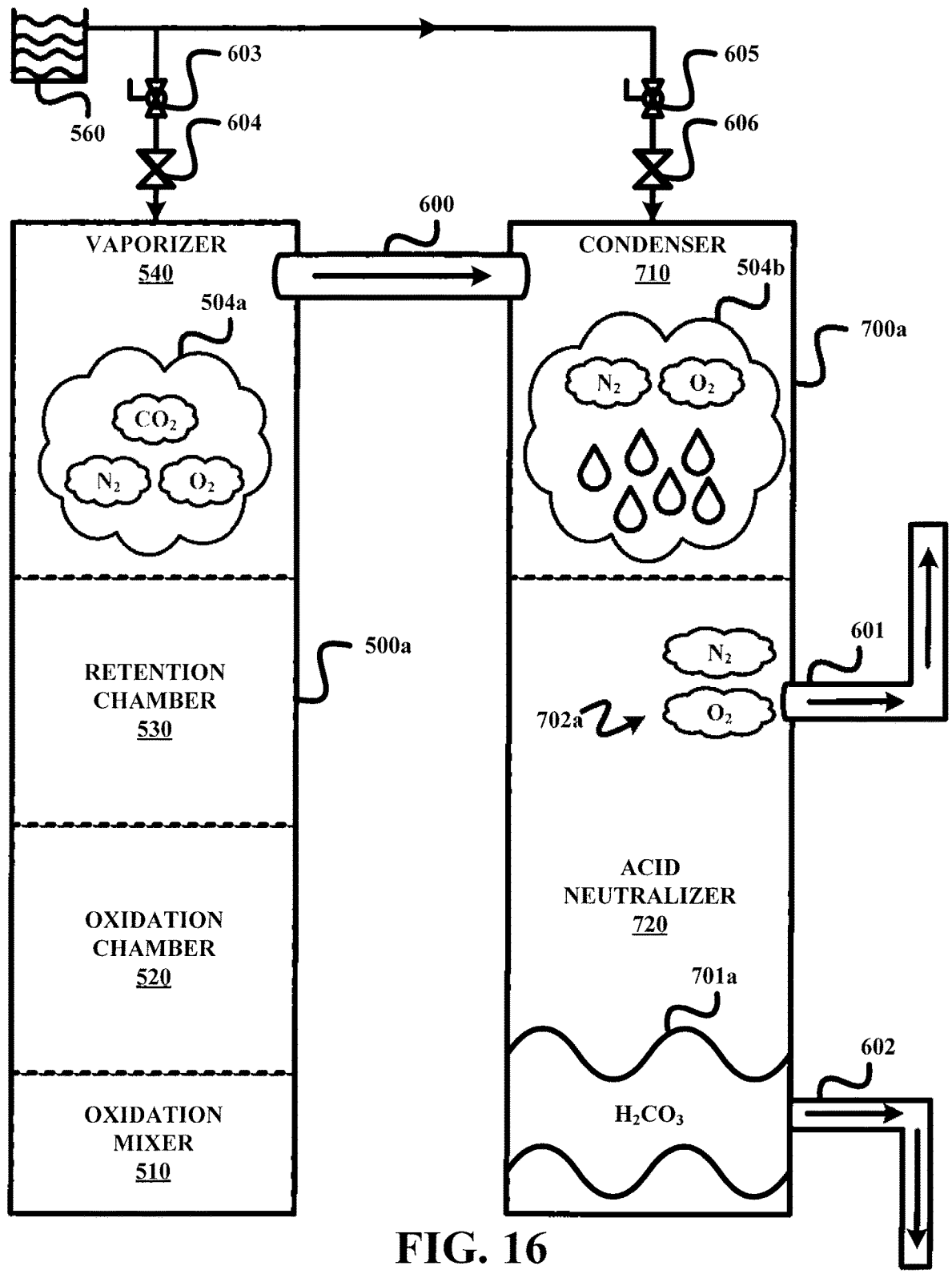
FIG. 16 illustrates an exemplary embodiment of the greenhouse gas processor based thermal oxidation system of FIG. 15 in accordance with the inventive principles of the present disclosure.

To further facilitate an understanding of inventions of the present disclosure, the following description of FIGS. 15 and 16 teaches basic inventive principles of a greenhouse gas capture based thermal oxidization system of the present disclosure. From this description, those having ordinary skill in the art will appreciate how to apply the inventive principles of the present disclosure for making and using additional numerous and various embodiments of greenhouse gas capture based thermal oxidization systems of the present disclosure.

Referring to FIG. 15, an exemplary greenhouse gas capture based thermal oxidation system of the present disclosure employs an embodiment 500 of a thermal oxidizer as previously described in the present disclosure, such as, for example, thermal oxidizer 50a of FIG. 2, thermal oxidizer 50b of FIG. 8, thermal oxidizer 300a of FIG. 11 and/or thermal oxidizer 300b of FIG. 14.

In operation, in accordance with the inventive principles of the present disclosure as set forth herein, thermal oxidizer 500 mixes an oxidant (e.g., atmospheric air) and waste gas (e.g., TRI gases) to yield a combustible waste gas stream 501 that sequentially undergoes a primary combustion reaction 502 into an oxygenated waste gas stream (not shown), a secondary combustion reaction 503 of the oxygenated waste gas stream into oxidized combustion products 504 (e.g., oxidized gases including $CO_2$, $H_2O$, $N_2$ and $O_2$ as shown). A final operational phase of thermal oxidizer involves a heat dissipation of oxidized combustion products 504 (e.g., a heat dissipation of >1750° F. to =300° F.).

Still referring to FIG. 15, the exemplary greenhouse gas processor based thermal oxidation system of the present disclosure further employs a greenhouse gas processor 700 in fluid communication with thermal oxidizer 500 (e.g., via a pipeline 600 as shown) to receive oxidized combustion products 504 at the reduced temperature. In one exemplary embodiment, thermal oxidizer 500 may include a heat exchanger to vent the oxidized combustion products 504 at the reduced temperature with the heat exchanger being enclosed by a sealed duct connector or the like to enable an unregulated or a regulated flow of the oxidized combustion products 504 at the reduced temperature to greenhouse gas processor 700. In a second exemplary embodiment, thermal oxidizer 500 may include a vaporizer integrated with a pipeline or the like to enable an unregulated or a regulated flow of a water vaporization of the oxidized combustion products 504 to greenhouse gas processor 700 as will be further described herein.

For purposes of describing and claiming the inventions of the present disclosure, greenhouse gas processor 700 broadly encompasses any machine in accordance with embodiments described in the present disclosure, as known in the art of the present disclosure and hereinafter conceived operable to extract greenhouse gas(es) 701 (e.g., oxidized gas $CO_2$ as shown) of oxidized combustion products 504 from non-greenhouse gas(es) 702 (e.g., oxidized gases $N_2$ and $O_2$ as shown). Thereafter, greenhouse gas processor 700 may vent non-greenhouse gas(es) 702 to atmosphere via a pipeline 601, and may control a transportation and/or a storage of greenhouse gas(es) 701 via a pipeline 602.

In one exemplary embodiment, greenhouse gas processor 700 may water saturate the oxidized combustion products into a liquid condensate to extract the greenhouse gas(es) 701 within oxidized combustion products 504 from non-greenhouse gas(es) 702 via a greenhouse gas condensation process in accordance with embodiments of the present disclosure, as known in the art of the present disclosure or hereinafter conceived. For example, the greenhouse gas condensation process may involve a fog spraying of water onto the water vaporization of oxidized combustion products 504 to yield a liquid condensation of the greenhouse gas(es) 702 followed by an acid neutralization of the liquid condensation of the greenhouse gas(es) 702 as will be further described herein.

Referring to FIG. 16, an exemplary embodiment of the greenhouse gas capture based thermal oxidation system of FIG. 15 employs an embodiment 500a of the thermal oxidizer 500 including an oxidation mixer 510, an oxidation chamber 520, a retention chamber 530, and a heat dissipator in the form of a vaporizer 540. In practice, vaporizer 540 broadly encompasses any device in accordance with embodiments of the present disclosure, as known in the art of the present disclosure and hereinafter conceived operable to utilizing a vaporing agent (e.g., water) to facilitate a vaporization 504a of the oxidized combustion products 504 flowing from retention chamber 530 to vaporizer 540 to thereby effect a heat dissipation of oxidized combustion products 504 (e.g., a reduction of heated oxidized gases from 1750° F.-1800° F. to ≈300° F.).

In operation, in accordance with the inventive principles of the present disclosure as set forth herein, oxidation mixer 510 mixes an oxidant (e.g., atmospheric air) and waste gas (e.g., TRI gases) to yield a combustible waste gas stream (not shown), a primary combustion reaction of the combustible waste gas stream into an oxygenated waste gas stream (not shown) occurs in oxidation chamber 520, and a secondary combustion reaction of the oxygenated waste gas stream into heated oxidized combustion products occurs in retention chamber 530.

For this embodiment, vaporizer 540 is in fluid communication with a water supply 560 via a water isolation valve 603 and a water control valve 604 to fog spray of water onto the oxidized combustion products of retention chamber 530 flowing into vaporizer 540 to yield a water vaporization 504a of oxidized combustion products 504 consisting of water vapor mixed with oxidized combustion products 504 at a reduced temperature. For example, a temperature of oxidized combustion products 504 exiting retention chamber 530 into vaporizer 540 may be approximately 1750° F. and vaporizer 540 may cool the oxidized combustion products 540 via the vaporization to a temperature of 300° F.

Still referring to FIG. 16, the exemplary embodiment of the greenhouse gas capture based thermal oxidation system of FIG. 15 further employs an embodiment 700a of the greenhouse gas processor 700 including a condenser 710 and an acid neutralizer 720.

In practice, condenser 710 broadly encompasses any device in accordance with the present disclosure, as known in the art of the present disclosure or hereinafter conceived, that is operable to water saturate the water vaporization of the oxidized combustion products to a dew point temperature, and an acid neutralizer 720 broadly encompasses any device in accordance with the present disclosure, as known in the art of the present disclosure or hereinafter conceived for neutralizing acidic liquid.

In operation, condenser 710 receives the water vaporization 504a of oxidized combustion products 504 and is in fluid communication with water supply 560 via a water isolation valve 605 and a water control valve 606 to fog spray water onto the water vaporization 504a of oxidized combustion products 504 to yield a saturation 504b of oxidized combustion products 504 at a further reduced temperature. For example, condenser 710 may water saturate 504b the vaporization 504a of oxidized combustion products 504 to below a dew point temperature of 80° F. to yield an acidic greenhouse condensate (e.g., carbonic acid $H_2CO_3$ droplets as shown) and non-greenhouse gas vapors (e.g., $N_2$ and $O_2$ as shown).

Acid neutralizer 720 contains a neutralizing agent (e.g., a granular organic neutralizing agent like limestone, not shown) to facilitate neutralizing an acidic greenhouse condensate 701a (e.g., neutral carbonic acid $H_2CO_3$). Acid neutralizer 720 thereafter separates the non-greenhouse gas(es) 702a (e.g., oxidized gases $N_2$ and $O_2$ as shown) from neutralized acidic greenhouse condensate 701a, whereby the non-greenhouse gas(es) 702a may be vented to atmosphere via pipeline 601 and a transportation and/or a storage of substantially neutralized acidic greenhouse condensate 701a may be controlled via pipeline 602.

Figure 17:
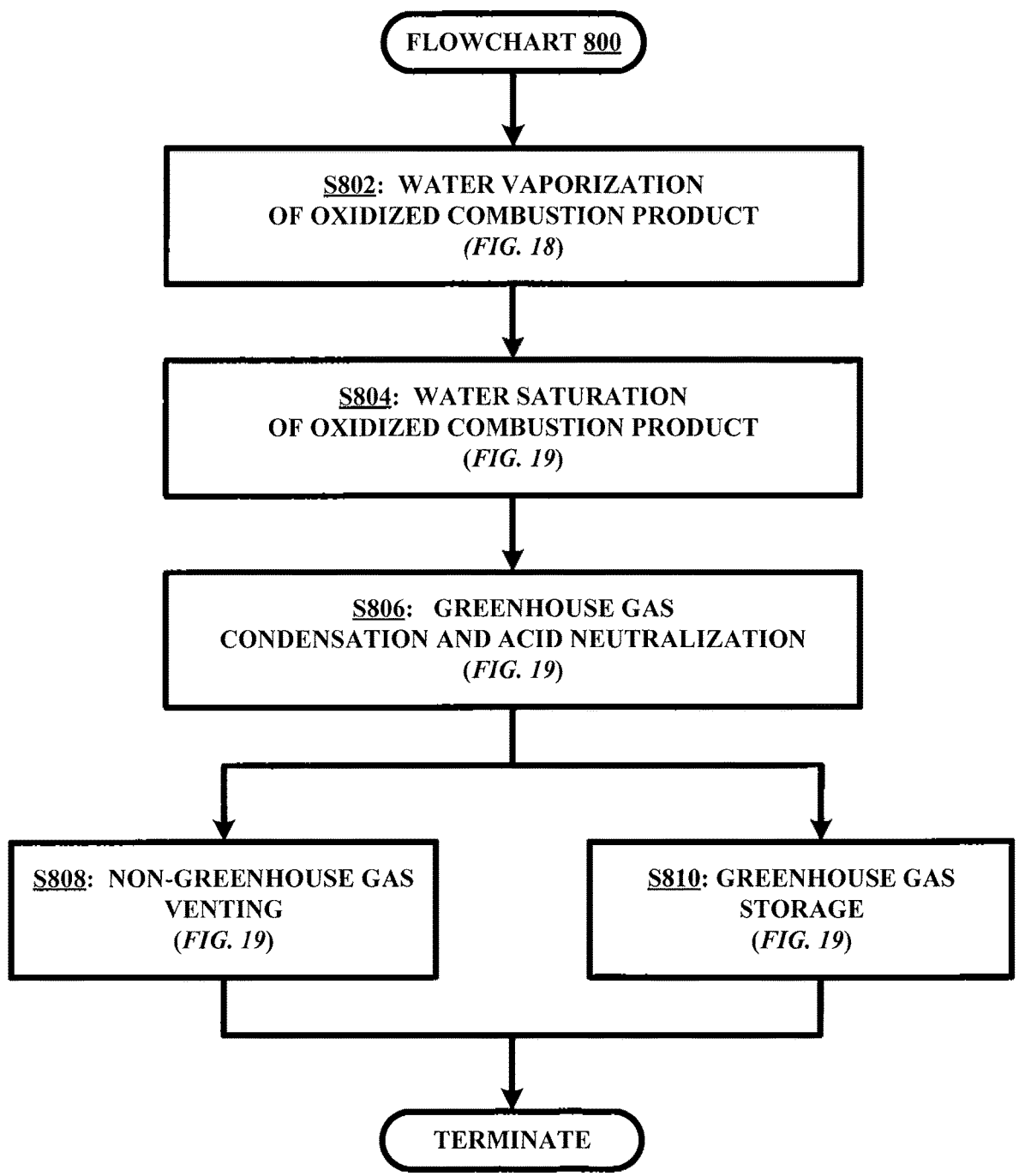
FIG. 17 illustrates a flowchart representative of an exemplary embodiment of greenhouse gas processing method in accordance with the inventive principles of the present disclosure.
Figure 18:
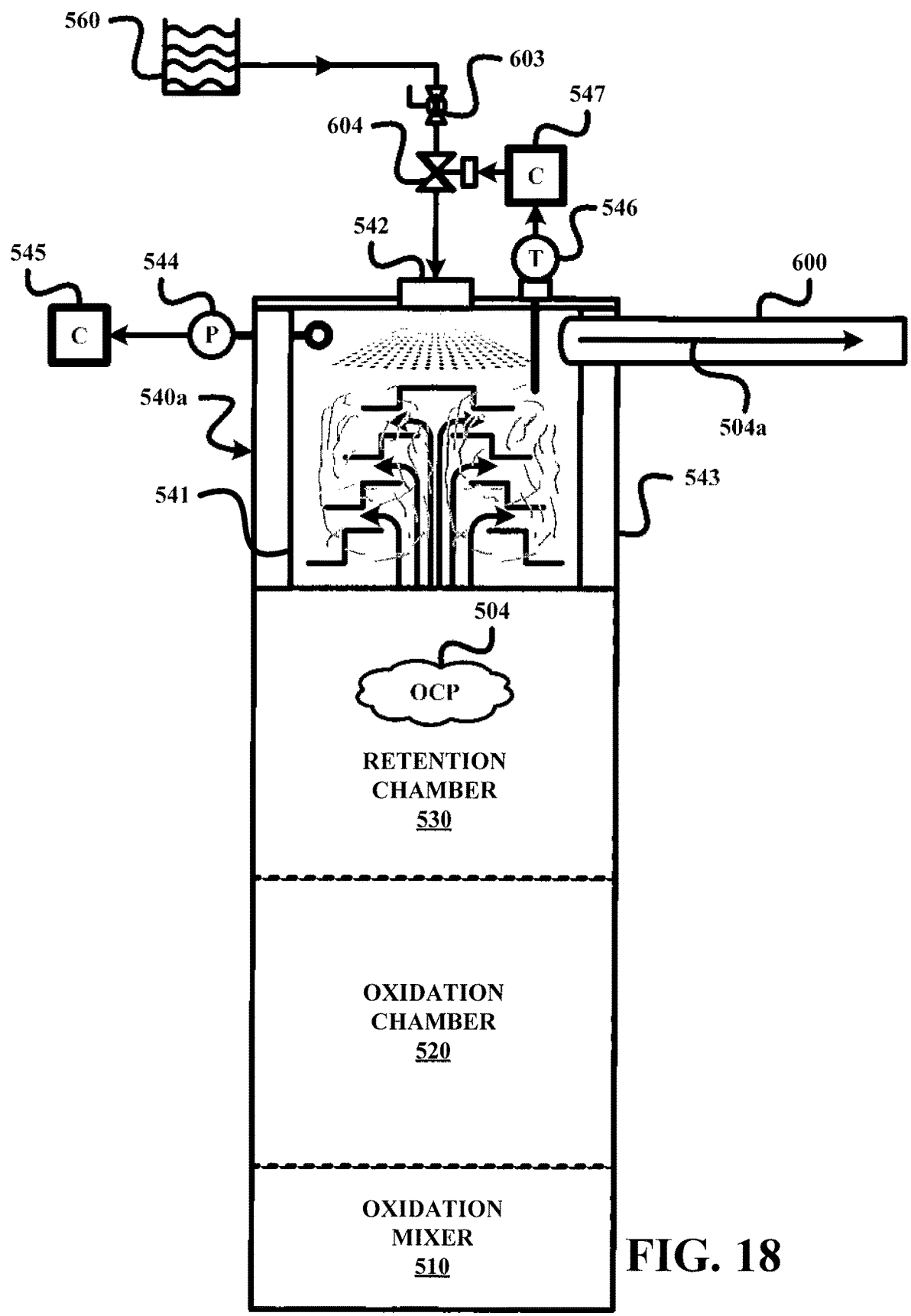
FIG. 18 illustrates an exemplary embodiment of the vaporizing heat dissipator of FIG. 17 in accordance with the inventive principles of the present disclosure.
Figure 19:
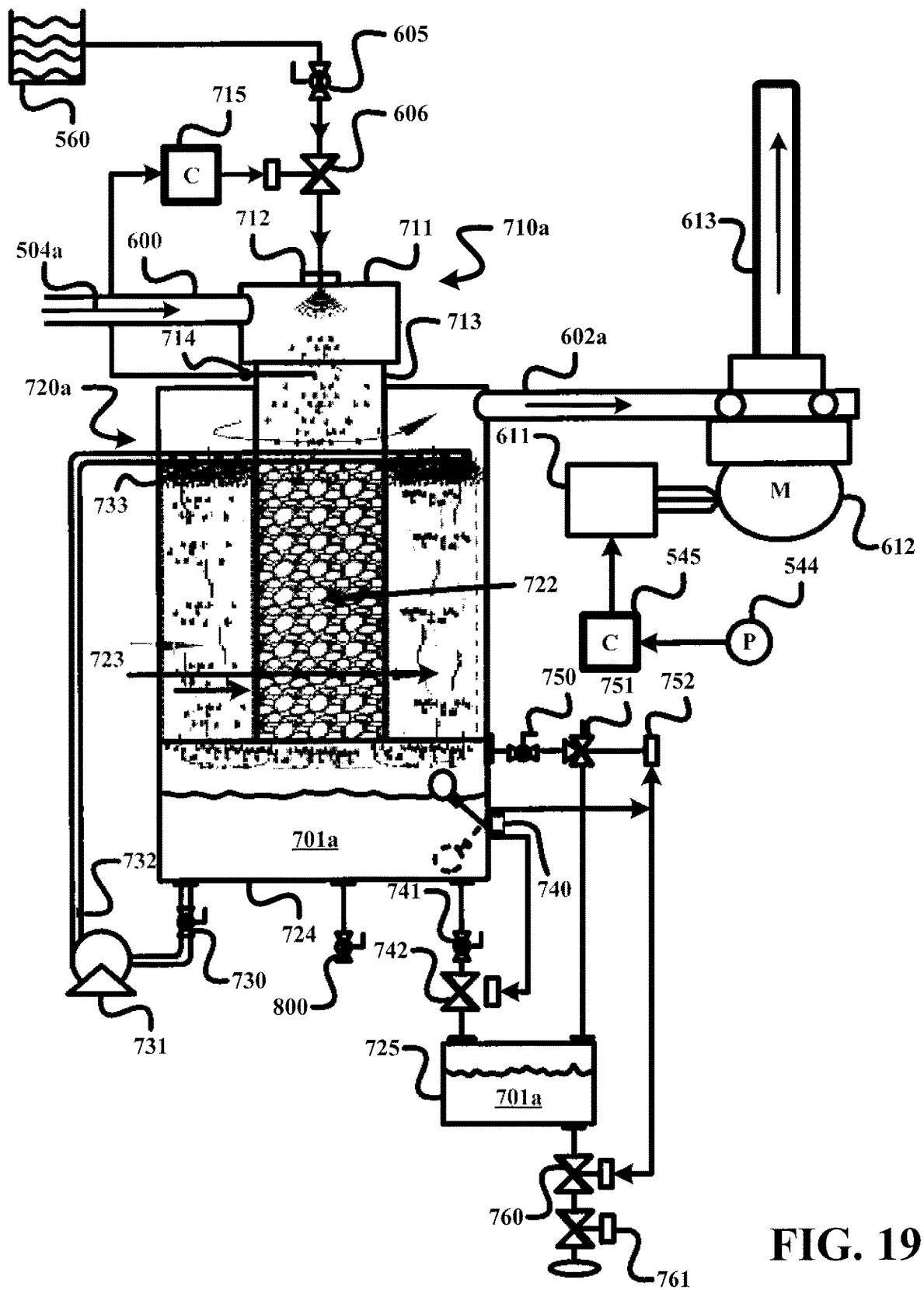
FIG. 19 illustrates exemplary embodiments of a condenser and an acid gas neutralizer of FIG. 1 in accordance with the inventive principles of the present disclosure.

To further facilitate an understanding of inventions of the present disclosure, the following description of FIGS. 17-19 teaches basic inventive principles of a greenhouse gas capture based thermal oxidization method of the present disclosure. From this description, those having ordinary skill in the art will appreciate how to apply the inventive principles of the present disclosure for making and using additional numerous and various embodiments of greenhouse gas capture based thermal oxidization methods of the present disclosure.

Referring to FIG. 17, a flowchart 800 represents an exemplary embodiment of a greenhouse gas capture based thermal oxidization method of the present disclosure. The following description of flowchart 800 will be in the context of a heat dissipating vaporizer 540a as shown in FIG. 18, a condenser 710a as shown in FIG. 19, and an acid neutralizer 720a as shown in FIG. 19.

Referring to FIG. 18, heat dissipating vaporizer 540a employs tray type vaporizing chamber 541 having a breather cover 543, a nozzle 542, a pressure sensor 544 embedded into vaporizing chamber 541, and a temperature sensor 546 embedded into vaporizing chamber 541.

Referring to FIG. 19, condenser 710a includes a condensing chamber 711, a nozzle 712, a vapor saturation chamber 713 and a temperature sensor 714 embedded into vapor saturation chamber 713. Acid neutralizer 720a includes a primary neutralizing chamber 722 enclosing a granular organic neutralizing material (e.g., limestone), a secondary neutralizing chamber 723 enclosing a granular organic neutralizing material (e.g., limestone), and a neutralized water chamber 724.

Referring to FIGS. 17 and 18, a stage S802 of flowchart 800 encompasses a water vaporization 504a of oxidized combustion products 504 (e.g., oxidized gases including $CO_2$, $H_2O$, $N_2$ and $O_2$) exiting retention chamber 530 into vaporizing chamber 541. More particularly, water supply 560 is controlled to supply a specified flow of water at a specified pressure to water control valve 604 (e.g., <1.0 gallons per hour at 60 psi). Temperature sensor 546 senses a temperature of vaporizing chamber 541 and a temperature controller 547 (e.g., a PID controller) controls water flow control valve 604 as a function of the sensed temperature of vaporizing chamber 541 to maintain a specified vaporization temperature point within vaporizing chamber 541 (e.g., 300° F.) as known in the art of the present disclosure. Water flowing through water flow control value 604 is frogged sprayed via nozzle 542 onto the oxidized combustion products 504 flowing through the trays of vaporizing chamber 541 to yield a flow of the water vaporization 504a of oxidized combustion products 504 at a reduced temperature through pipeline 600. Pressure sensor 544 senses a pressure within vaporizing chamber 541 for purposes of controlling a flow rate of the water vaporization 504a of oxidized combustion products 504 through pipeline 600 as will be subsequently described herein.

Referring to FIGS. 17 and 19, a stage S804 of flowchart 800 encompasses a water saturation of vaporized oxidized combustion products 504a flowing into condenser 710a. More particularly, a motorized air pump 612 is operated via a motor speed controller 611 to pull the water vaporization 504a of oxidized combustion products 504 through pipeline 600 into condensing chamber 711. Motor speed controller 61 is controlled via a pressure controller 545 (e.g., a PID controller) to control the flow rate of the water vaporization 504a of the oxidized combustion products 504 through pipeline 600 into condensing chamber 711 as a function of a pressure within vaporizing chamber 541 (FIG. 18) as sensed by pressure sensor 544 as known in the art of the present disclosure.

Water supply 560 is controlled to supply a specified flow of water at a specified pressure to water control valve 606 (e.g., <1.0 gallons per hour at 60 psi), and water flowing through water flow control value 606 is fogged sprayed via nozzle 712 upon vaporized oxidized combustion products 504a flowing into fogging condensing chamber 711 to yield a water saturation of vaporized oxidized combustion products 504a in vapor saturation chamber 713. Temperature sensor 714 senses a temperature of vapor saturation chamber 713 and a temperature controller 715 (e.g., a PID controller) controls water flow control valve 606 as a function of the sensed temperature of vapor saturation chamber 713 to maintain a specified temperature point within condensation chamber 713 (e.g., 80° F.) as known in the art of the present disclosure. As a result, a condensation of greenhouse gas(es) drops through chamber 713 to the primary neutralizing chamber 722 of acid neutralizer 720a.

Still referring to FIGS. 17 and 19, a stage S806 of flowchart 800 encompasses an acid neutralization of the saturated oxidized combustion products. More particularly, the saturated oxidized combustion products downwardly percolate through the granular organic neutralizing material (e.g., limestone) of primary neutralizing chamber 722 whereby a substantially portion of the acidic greenhouse gas of the saturated oxidized combustion products dissolves into neutralized liquid 701a maintained in a neutralized water chamber 724, and the non-greenhouse gases of the saturated oxidized combustion products upwardly flowing through the granular organic neutralizing material (e.g., limestone) of secondary neutralizing chamber 723. The neutralized liquid 701a within neutralized water chamber 724 is continually or intermittently circulated via circulating pump 731 and a pipeline 732 to a nozzle 733 spraying the neutralized liquid 701a into secondary neutralizing chamber 723, whereby any residue of acidic greenhouse gas upwardly flowing through secondary neutralizing chamber 723 may also be dissolved into neutralized liquid 701a maintained in neutralized water chamber 724.

Still referring to FIGS. 17 and 19, a stage S808 of flowchart 800 encompassing a venting of the non-greenhouse gases into atmosphere and a stage S810 of flowchart 800 encompasses a storage of neutralized liquid 701a for future transportation. More particularly, the motorized air pump 612 will pull the non-greenhouse gas(es) from secondary neutralizing chamber 723 through pipeline 602 and an exhaust 613 to atmosphere. Additionally, a control float switch 740 within a neutralized water chamber 724 is operated to control a water flow control value 742 to drain neutralized liquid 701a to a surge neutralized water tank 725 whenever a volume of neutralized liquid 701a within neutralized water chamber 724 exceeds a specified volume. Additionally, a pressure equalizing value 751 and a pressure isolation valve are operated to relieve pressure within neutralized water chamber 724 as a function of control float switch 740.

While various embodiments of the present invention have been illustrated and described, it will be understood by those skilled in the art that the methods and the system as described herein are illustrative, and various changes and modifications may be made and equivalents may be substituted for elements thereof without departing from the true scope of the present invention. In addition, many modifications may be made to adapt the teachings of the present invention without departing from its central scope. Therefore, it is intended that the present invention not be limited to the particular embodiments disclosed as the best mode contemplated for carrying out the present invention, but that the present invention include all embodiments falling within the scope of the appended claims.

The invention claimed is:

1. A thermal oxidization system, comprising:
   a thermal oxidizer including an oxidation mixer, an oxidation chamber, a retention chamber and a heat dissipater forming a fluid flow path for a thermal oxidation of a waste gas,
   wherein the oxidation mixer is structurally configured to facilitate a combustible mixture of a waste gas stream and an oxidant within the oxidation mixer into a combustible waste gas stream flowing within the oxidation mixer,
   wherein the oxidation chamber is in fluid communication with the oxidation mixer to receive a flow of the combustible waste gas stream,
   wherein the oxidation chamber includes a primary heating element or a gas burner to facilitate a primary combustion reaction of the combustible waste gas stream into an oxygenated waste gas stream within the oxidation chamber,
   wherein the retention chamber is in fluid communication with the oxidation chamber to receive a flow of the oxygenated waste gas stream,
   wherein the retention chamber is structurally configured to facilitate a secondary combustion reaction of the oxygenated waste gas stream into oxidized gases within the retention chamber,
   wherein the oxidized gases includes at least one greenhouse gas,
   wherein the heat dissipater is in fluid communication with the retention chamber to receive a flow of the oxidized gases,
   wherein the heat dissipator is structurally configured to heat dissipate a flow of the oxidized gases within the heat dissipator; and
   a greenhouse gas processor in fluid communication with the heat dissipator to receive the oxidized gases flowing within the heat dissipator, wherein the greenhouse gas processor is structurally configured to extract the at least one greenhouse gas from the oxidized gases within the greenhouse gas processor.

2. The thermal oxidization system of claim 1, wherein the heat dissipator structurally configured to heat dissipate the oxidized gases flowing within the heat dissipator includes:
   the heat dissipator being structurally configured to facilitate a water vaporization of the oxidized gases flowing within the heat dissipator.

3. The thermal oxidization system of claim 2, further comprising:
   a vaporization controller structurally configured to regulate the water vaporization by the heat dissipator of the oxidized gases flowing within the heat dissipator based on a temperature of the oxidized gases flowing within the heat dissipator.

4. The thermal oxidization system of claim 1, wherein the greenhouse gas processor structurally configured to extract the at least one greenhouse gas from the oxidized gases within the greenhouse processor includes:
   the greenhouse gas processor being structurally configured to form an acidic greenhouse gas condensate within the greenhouse gas processor.

5. The thermal oxidization system of claim 4, wherein the greenhouse gas processor structurally configured to liquid condensate the at least one greenhouse gas within the greenhouse gas processor includes:
   the greenhouse gas processor being structurally configured to facilitate a water saturation of the oxidized gases within the greenhouse gas processor.

6. The thermal oxidization system of claim 5, further comprising:
   a condensation controller structurally configured to regulate the water saturation by the condenser of the oxidized gases flowing within the condenser based on a temperature of the oxidized gases flowing within the condenser.

7. The thermal oxidization system of claim 1, wherein the greenhouse gas processor is further structurally configured to capture the at least one greenhouse gas from the oxidized gases within the greenhouse gas processor.

8. The thermal oxidization system of claim 1, wherein the greenhouse gas processor is further structurally configured to form an acidic greenhouse gas condensate of the at least one greenhouse gas from the oxidized gases within the greenhouse gas processor.

9. The thermal oxidization system of claim 8, wherein the greenhouse gas processor structurally configured to capture the liquid condensation of the at least one greenhouse gas from the oxidized gases within the greenhouse gas processor includes:
   the greenhouse gas processor being structurally configured to acid neutralize the acidic greenhouse gas condensate by the greenhouse gas processor of the at least one greenhouse gas within the greenhouse gas processor.

10. The thermal oxidization system of claim 1,
    wherein the oxidized gases received by the greenhouse gas processor includes at least one non-greenhouse gas; and
    wherein the greenhouse gas processor is further structurally configured to vent the at least one non-greenhouse gas.

11. The thermal oxidization system of claim 1, further comprising:
    a thermocouple in one of:
       thermal communication with the oxidation chamber to measure a temperature of the oxidation chamber, or
       thermal communication with the retention chamber to measure a temperature of the retention chamber, or
       thermal communication with the heat dissipater to measure a temperature of the heat dissipater.

12. The thermal oxidization system of claim 1, further comprising at least one of:
    a solenoid valve operable for regulating a feed of the waste gas stream into the oxidation mixer; and
    an oxidant supply operable for regulating a feed of the oxidant into the oxidation mixer.

13. The thermal oxidization system of claim 1, wherein the retention chamber includes:
    a secondary heating element operable to facilitate a secondary combustion reaction of the combustible oxygenated waste gas stream into the oxidized gases within the retention chamber.

14. The thermal oxidization system of claim 1, wherein the oxidation chamber further includes a supplemental air inlet structurally configured to facilitate a combustible mixture of an additional oxidant and the oxygenated waste gas stream flowing into the retention chamber.

15. The thermal oxidization system of claim 1, further comprising:

an oxidation controller structurally configured to regulate an operation of the thermal oxidizer including at least one of:
  regulating the combustible mixture of the waste gas stream and the oxidant into the combustible waste gas stream within the oxidation mixer;
  regulating the primary combustion reaction of the combustible waste gas stream into an oxygenated waste gas stream within the oxidation chamber; and
  regulating the secondary combustion reaction of the oxygenated waste gas stream into the oxidized gases within the retention chamber.

16. The thermal oxidization system of claim 15, further comprising:
  a thermocouple in thermal communication with the oxidation chamber to measure a temperature of the oxidation chamber; and
  wherein, responsive to a measurement of the temperature of the oxidation chamber by the thermocouple, the oxidation controller is structurally configured to monitor the temperature of the oxidation chamber relative to at least one regulation threshold representative of a controlled operation of the thermal oxidizer.

17. The thermal oxidization system of claim 15, further comprising:
  a thermocouple in thermal communication with the retention chamber to measure a temperature of the retention chamber; and
  wherein, responsive to a measurement of the temperature of the retention chamber by the thermocouple, the oxidation controller is structurally configured to monitor the temperature of the retention chamber relative to at least one regulation threshold representative of a controlled operation of the thermal oxidizer.

18. The thermal oxidization system of claim 15, further comprising:
  a thermocouple in thermal communication with the heat dissipater to measure a temperature of the heat dissipater; and
  wherein, responsive to a measurement of the temperature of the heat dissipater by the thermocouple, the oxidation controller is structurally configured to monitor the temperature of the heat dissipater relative to at least one regulation threshold representative of a controlled operation of thermal oxidizer.

19. The thermal oxidization system of claim 15, further comprising at least one of:
  a data logger structurally configured to log a regulation of the operation of the thermal oxidizer by the oxidation controller; and
  a data reporter structurally configured to remotely report the regulation of the operation of the thermal oxidizer by the oxidation controller.

20. The thermal oxidization system of claim 1,
  wherein the oxidation mixer is further structurally configured to facilitate an ignitable mixture of a natural gas stream and the oxidant within the oxidation mixer into an ignitable natural gas stream flowing with the oxidation mixer;
  wherein a gas burner is in fluid communication with the oxidation mixer to receive a flow of the ignitable nature gas stream within the oxidation mixer; and
  wherein the gas burner is structurally configured to ignite the ignitable nature gas stream within the oxidation chamber.

* * * * *